Figure 17:
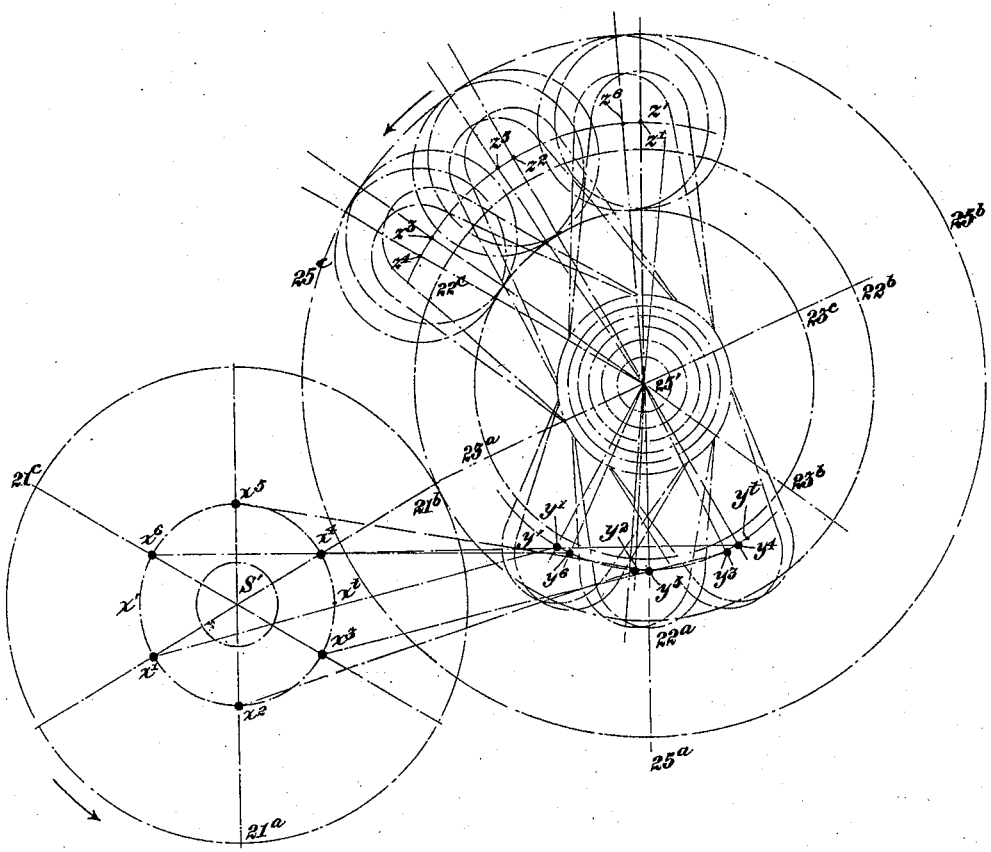

F. H. RICHARDS.
TYPE BAR MACHINE.
APPLICATION FILED MAR. 7, 1901. RENEWED AUG. 13, 1908.
919,227.
Patented Apr. 20, 1909.
10 SHEETS—SHEET 1.
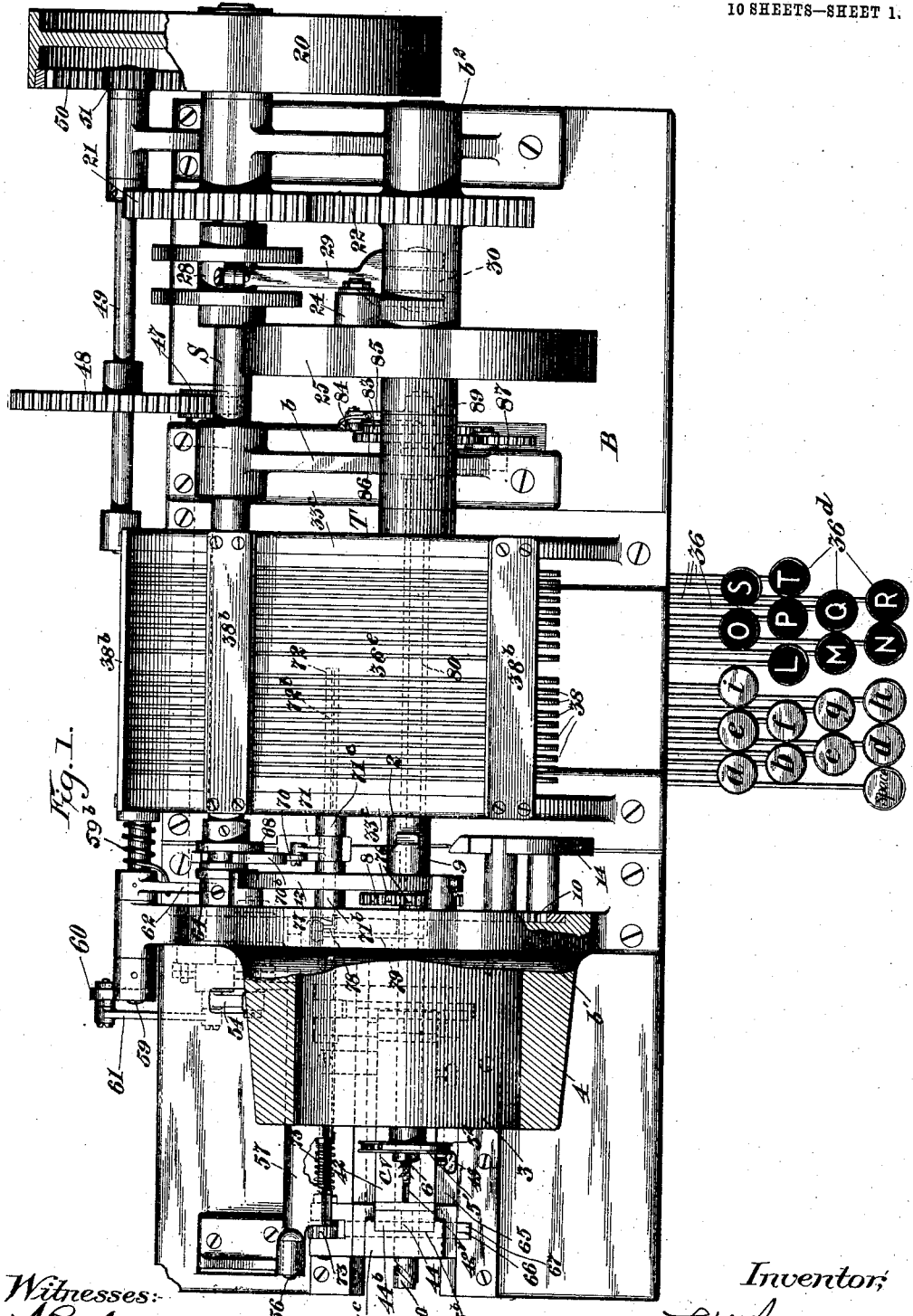
Witnesses:
Inventor:

F. H. RICHARDS.
TYPE BAR MACHINE.
APPLICATION FILED MAR. 7, 1901. RENEWED AUG. 13, 1908.
919,227.
Patented Apr. 20, 1909.
10 SHEETS—SHEET 2.
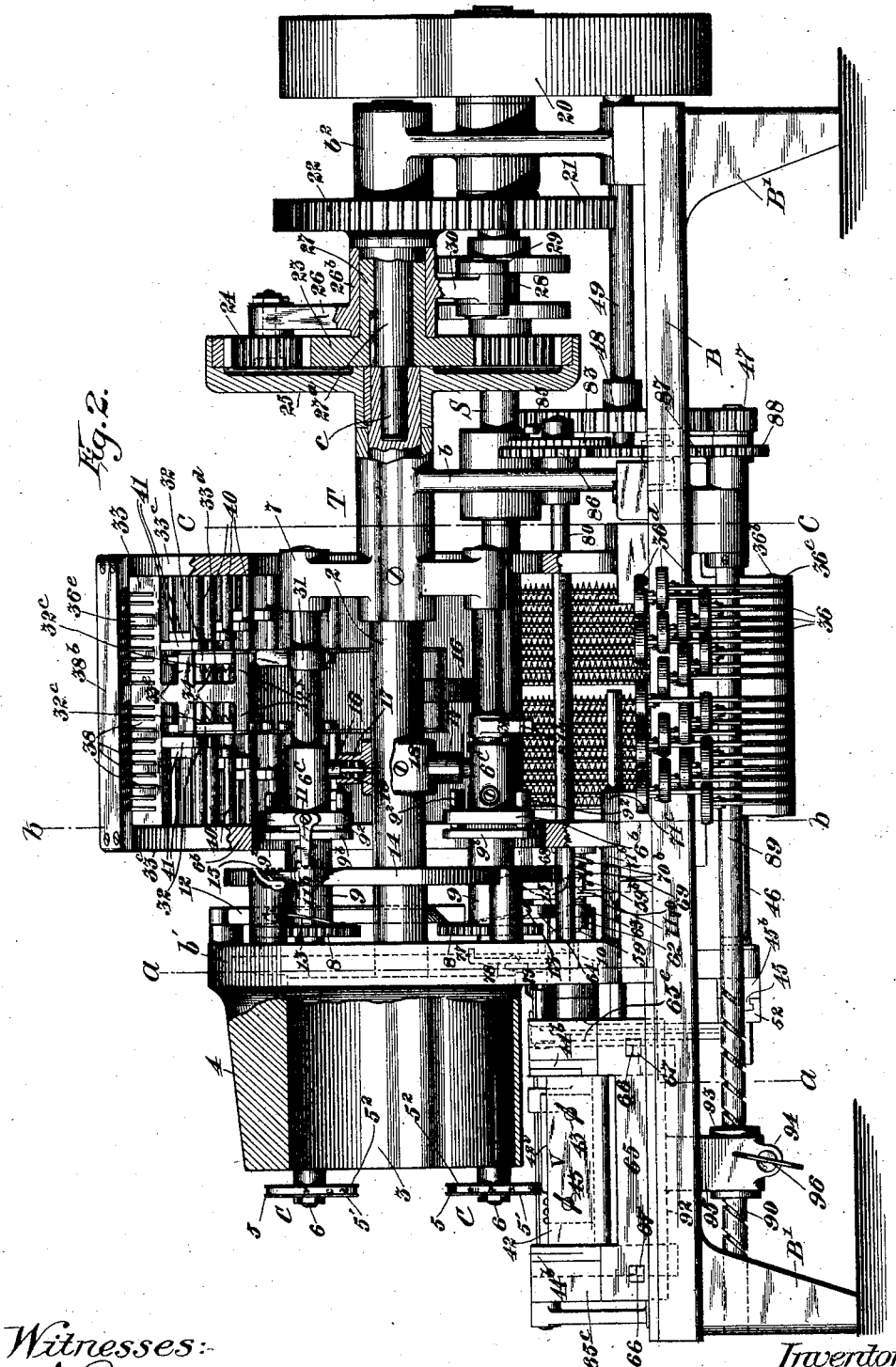
Witnesses:
Inventor,

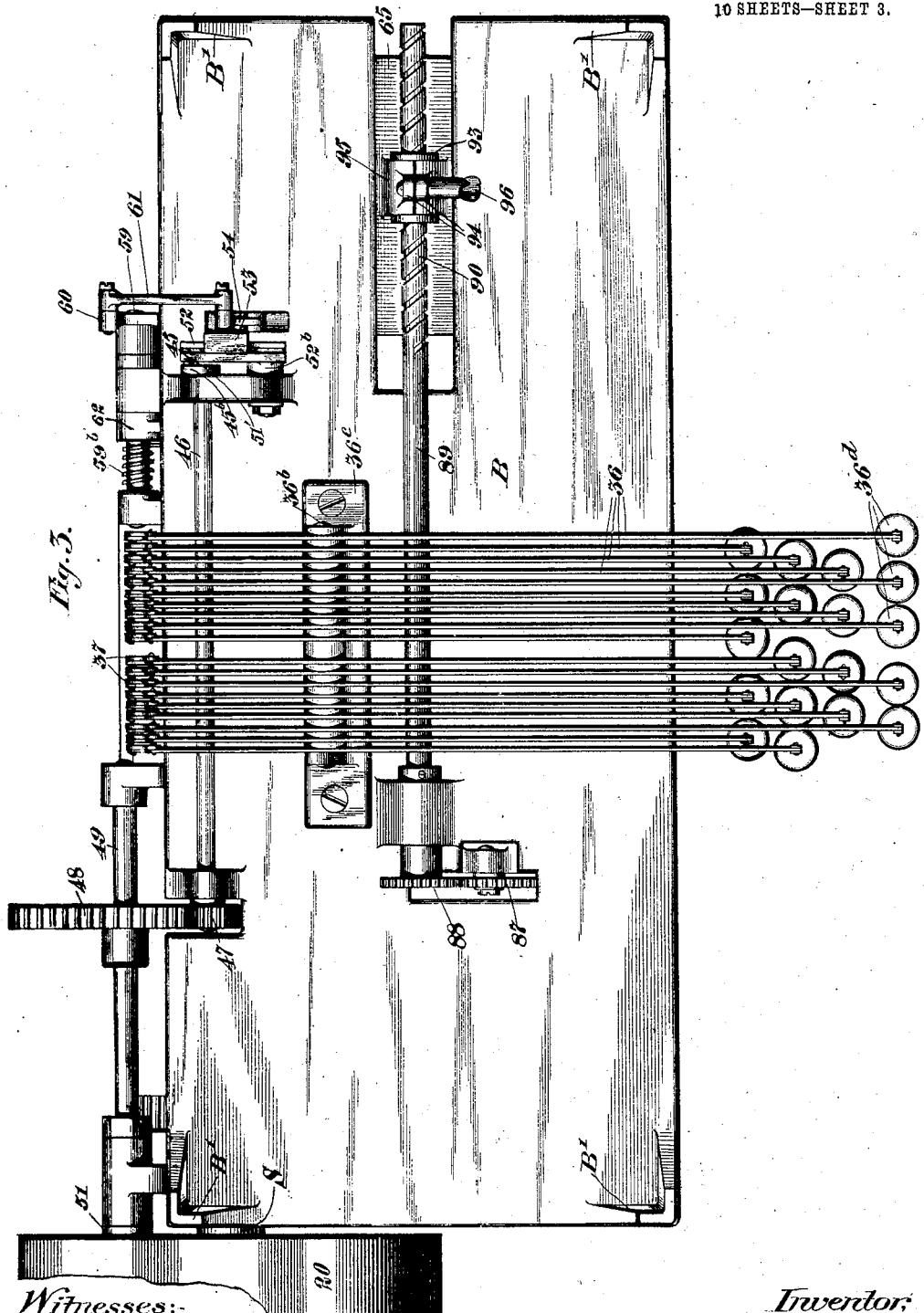

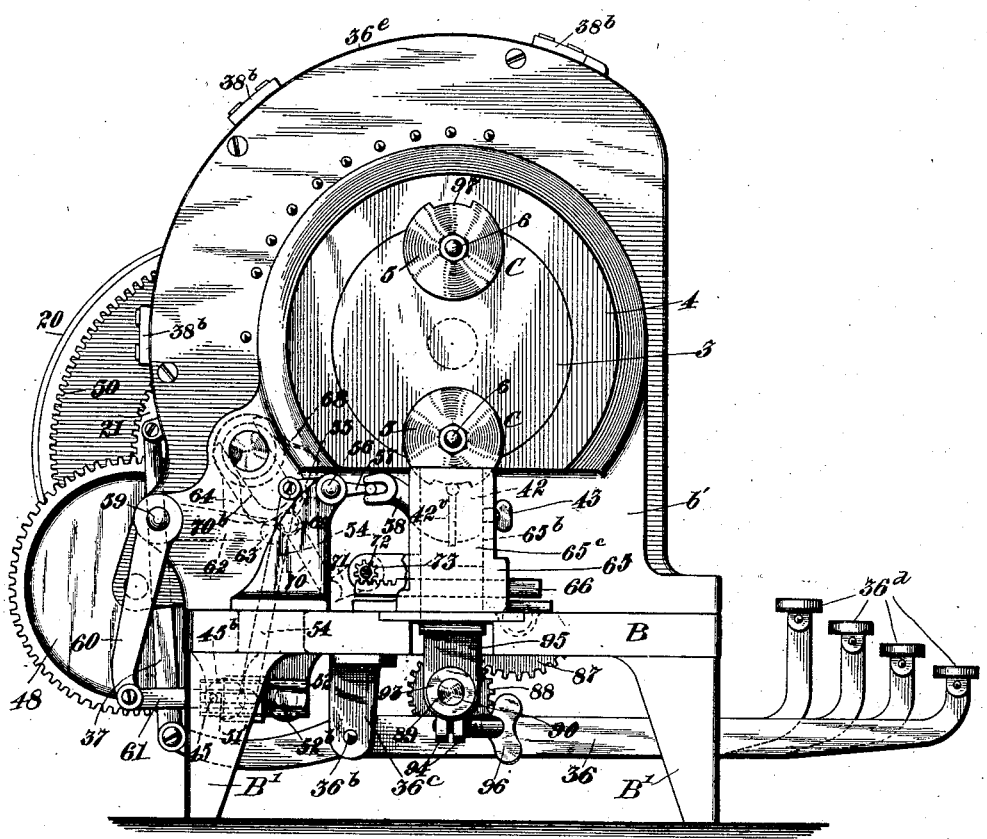

F. H. RICHARDS.
TYPE BAR MACHINE.
APPLICATION FILED MAR. 7, 1901. RENEWED AUG. 13, 1908.
919,227.
Patented Apr. 20, 1909.
10 SHEETS—SHEET 5.
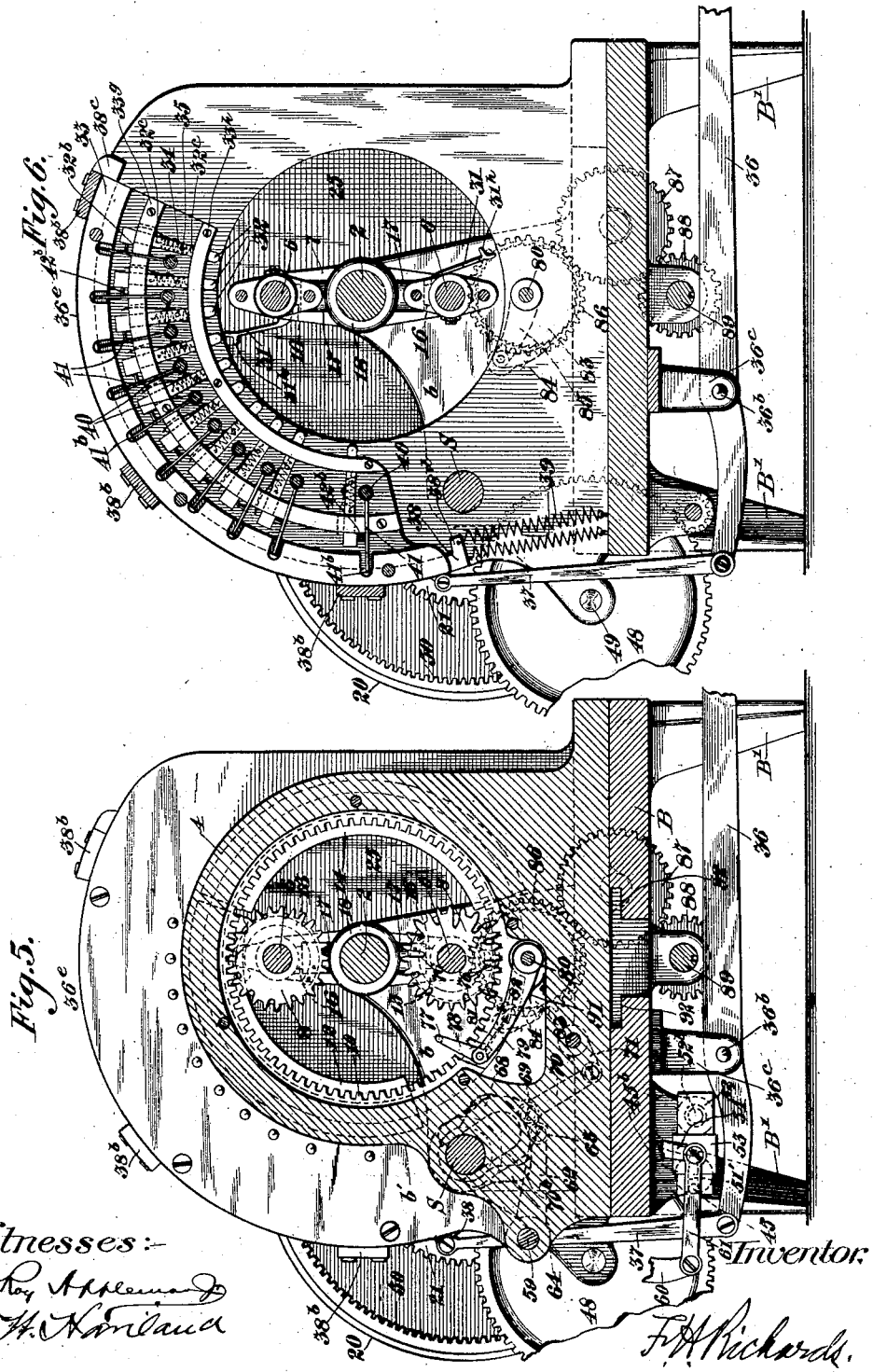

F. H. RICHARDS.
TYPE BAR MACHINE.
APPLICATION FILED MAR. 7, 1901. RENEWED AUG. 13, 1908.
919,227.
Patented Apr. 20, 1909.
10 SHEETS—SHEET 6.
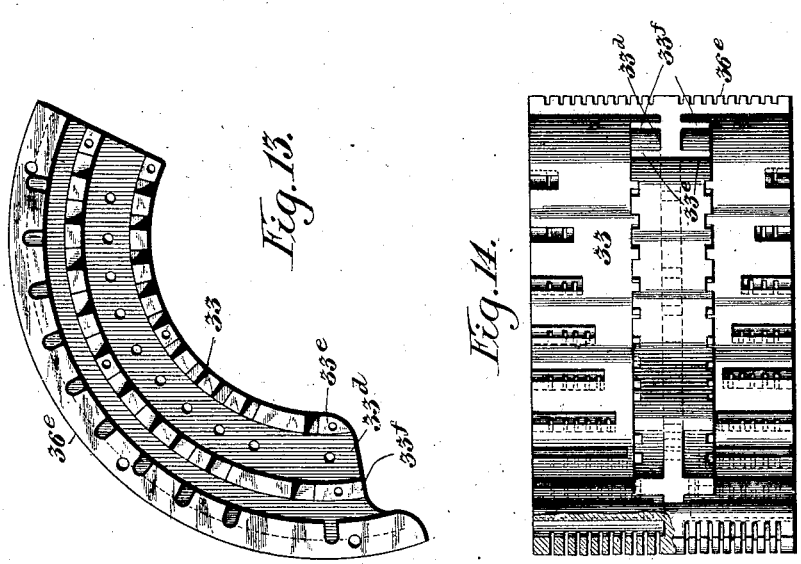
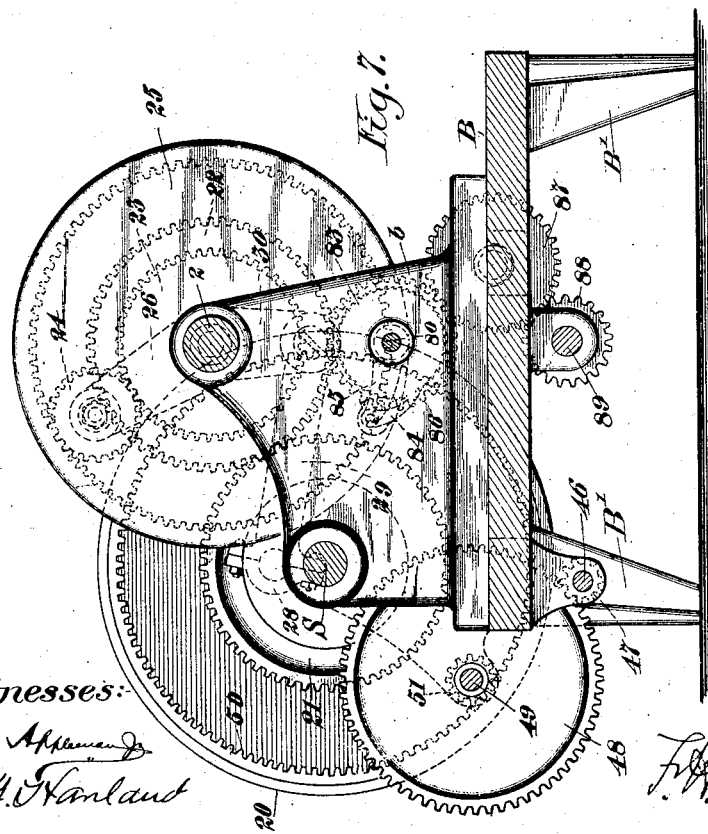

F. H. RICHARDS.
TYPE BAR MACHINE.
APPLICATION FILED MAR. 7, 1901. RENEWED AUG. 13, 1908.
919,227.
Patented Apr. 20, 1909.
10 SHEETS—SHEET 7.
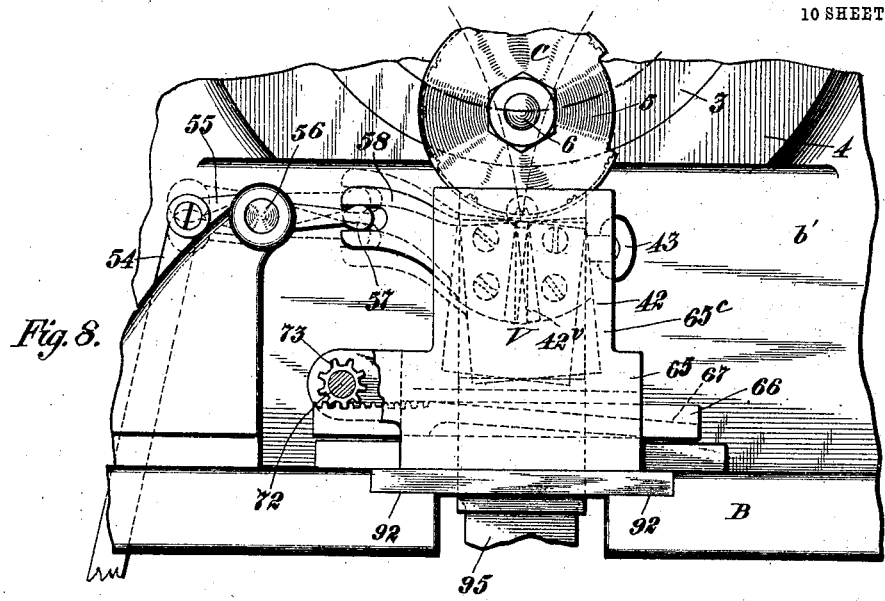
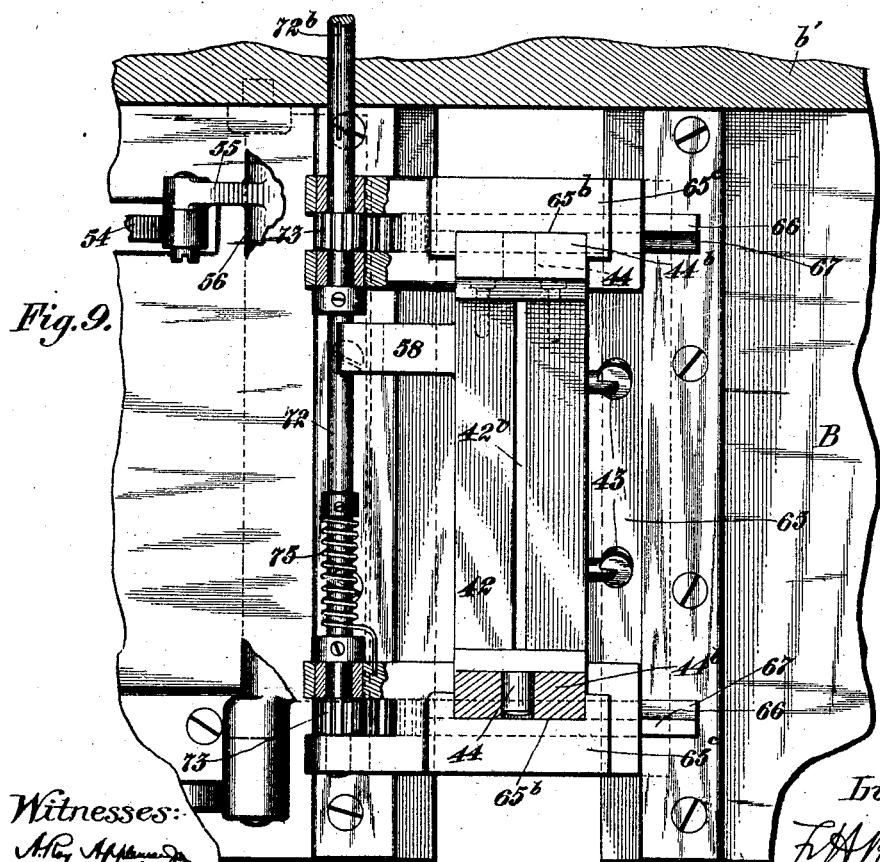

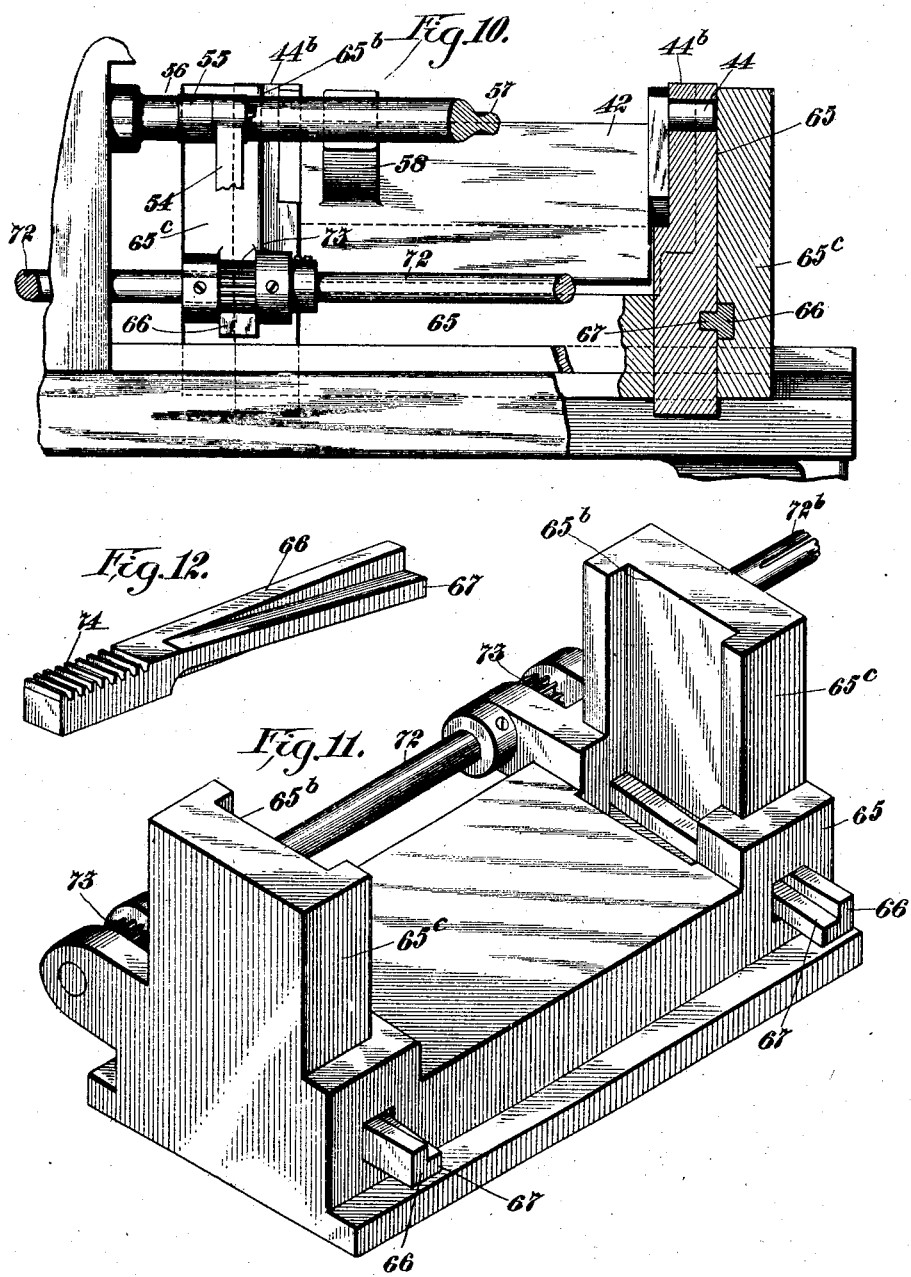

F. H. RICHARDS.
TYPE BAR MACHINE.
APPLICATION FILED MAR. 7, 1901. RENEWED AUG. 13, 1908.
919,227.
Patented Apr. 20, 1909.
10 SHEETS—SHEET 9.
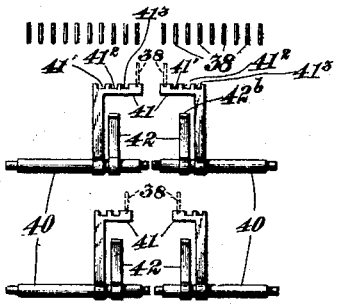
Fig. 15.
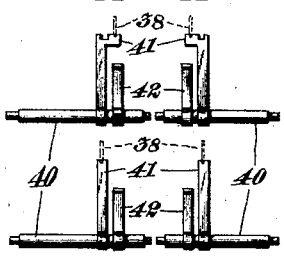
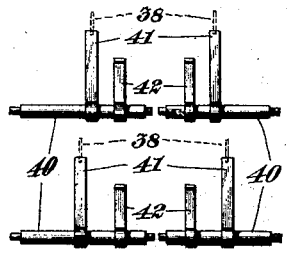
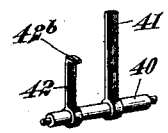
Fig. 16.
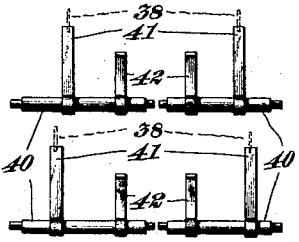
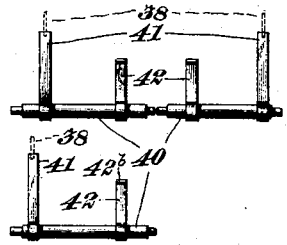
Witnesses:-
Inventor:
F. H. Richards.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

TYPE-BAR MACHINE.

No. 919,227.      Specification of Letters Patent.      Patented April 20, 1909.

Application filed March 7, 1901, Serial No. 50,194. Renewed August 13, 1908. Serial No. 448,375.

*To all whom it may concern:*

Be it known that I, FRANCIS H. RICHARDS, a citizen of the United States, residing at Hartford, in the county of Hartford and State of Connecticut, have invented certain new and useful Improvements in Type-Bar Machines, of which the following is a specification.

This invention relates to machines for making types and typebars in the cold, that is, from type-formable material in the solid condition as distinguished from a fluid state attained by the application of heat other than that arising by virtue of or which may be generated by the operations to which the material is subjected, and particularly to that class of mechanisms which operate to produce a type suitable for use in the typographic art through the medium of a die-like instrumentality.

Many efforts have been made to produce from a mass of type-formable material by the action of a die a type suitable for use in and which would satisfactorily meet the requirements of the typographic art in point especially of sharp definition and durability, and to combine a number of such types so formed in lines of composed types or type faces in the endeavor to produce a typebar that would satisfy the demands of the art for successful commercial application. Such attempts have generally been made, so far as I am aware, to form the type as the result of direct pressure exerted by the die upon the type-formable material unaccompanied by any concurrent or subsidiary force or movement designed to facilitate the production of an accurate and sharply defined counterpart of the type-forming die; that is, regarding the progressive movement of the die, for instance, into a position which it occupies at some portion of the period consumed in doing its greatest amount of work and its subsequent recession from that position as too inconsiderable in its type-perfecting effect to be taken into account, there has been no general recognition of the fact that, practically, a continued rectilinear movement of a die into a mass of type-formable material, co-extensive in duration with the period of type formation, is ineffectual to completely and absolutely fill the die. The natural cohesion of the material causes during the shearing action of the cutting edges of the die (that is, those edges which determine the contour of the base of the type-block where it joins the body or stock of the blank) a portion adjacent to or in what will eventually form the impression surface of the type to be dragged or to flow in the direction of die movement. Even if this rectilinear motion of the die is continued to a point where the bottom of the die cavity contacts with the column or block of material in the die and beyond, the flowage manifestly taking place along the line of least resistance has been demonstrated by experiment to be in the ordinary typebar-blank in a direction other than that which would completely fill the sharp angular recesses and hair line spaces of the die. This mode of type-forming results therefore in a type, the edges of whose impression surface are lacking in sharpness and definition. Such flowage has been shown to take place laterally downward from under the edge of the die and even in the body of the blank itself to a degree sufficient in some cases to produce perceptible alteration in the cross-sectional form of the blank at points within the sphere of flowage action. So much for a brief consideration of the conditions to be met with in attempting to form a single type upon the usual form of blank which shall possess a sharply outlined upper surface. When, additionally, it is attempted to form upon a typebar-blank a second type at a point which brings an already formed type upon the blank within the flowage radius (for so I may term the maximum distance in any particular direction at which a movement in the mass of the material occurs sufficient in extent to distort or displace a formed surface) established and determined by the mode of applying the die adopted in any particular case, an additional factor enters into the problem, and requires consideration, to wit: the disposal of the excess or surplus material in the field determined by the contact faces of the die and which is severed or sheared by the latter during its action from the material building up and forming the type-block. This excess or surplus material in connection with the formative stresses induced by the moving die not only variously modifies the flowage concurring with and created by the advancement of the die into the blank in the absence of any provision for controlling its directional movement, but also invariably results in the overriding of the adjacent type or the displacement of the same from its proper relative position as usually and ordinarily spaced in composition. It has proved impracticable therefore to produce a satisfactory typebar for typographic use by the simple pressure of dies at successive points along the length of a blank or bar of metal. These very requirements, viz., the existence of some provision to suppress or so govern the action of the surplus material severed from the type-block by the die as that it shall not disturb an adjacent type, the control of the induced flowage for the same purpose, and the provision of a mode of die action which shall operate to produce a sharply defined and satisfactory type have not, so far as known to me, been fulfilled in the construction and operation of any prior machine.

I am aware that the manufacture of a typebar has been contemplated which involves the setting off of consecutive typeblocks along the edge of a typebar-blank previous to the action of the individual dies thereon by slotting the edge of the blank cross-wise to remove the excess material from between the blocks, each block being trimmed prior to the action of the die upon it to roughly form the block to shape. These cross slots afford a space for the accommodation of the excess material when the dies are brought into engagement with the blocks to form types, flowage therefore taking place in a direction lengthwise of the blank. But the connection of the typeblock produced in this manner with the body of the blank is weakened by the very fact that it is necessary to first cross the slot blank and isolate each block from its fellows and the type-block is rendered less able to withstand the crushing action of the die by the necessity of carrying the slots to a depth sufficient to nullify the tendency of both the excess material sheared from the typeblock and the type-formative stresses to displace or destroy a type or types at the side. Moreover, by reason of this preliminary isolation of the block and its roughing out, a number of operations are necessary, consuming time in their performance and requiring a plurality of appropriate tools or operative devices. Furthermore, the type so formed lacks definition and sharpness, for although the action of the die on the metal if the die is rapidly rolled into place and away may be likened to the blow of one upon the other, the resulting product has proved to be similar in character to that produced by the application of a formative pressure in a substantially rectilinear direction as referred to above.

Two of the principal features which characterize the operation of the machine embraced in my present invention are these: I avoid the necessity of setting off the typeblocks before the dies are brought into action, and I subject each type-formable portion of the blank to repeated actions which, for the purpose of producing a symmetrically formed type, are preferably alternated from side to side of the mass. These repeated actions result in the gradual reduction of the type-block to shape, and are of such character that they operate to strengthen and finish the base portions of the block where the latter connects with the body of the blank and to condense and compact the impression and other surfaces of the type, besides operating to satisfactorily fill the angular portions and hair line spaces of the die cavity.

The drawings accompanying the following specification illustrate a machine whose construction and operation embody my present invention.

In these drawings Figure 1 is a plan view of such a machine and shows certain portions in section. Fig. 2 is a front elevation, certain portions also being shown in section in this figure. Fig. 3 is a view looking at the under side of the machine. Fig. 4 is an end elevation looking in the direction in which certain die-wheels embodied in the machine appear. Figs. 5, 6, and 7 are transverse vertical sections on the planes of the lines a—a, b—b, and c—c, respectively, in Fig. 2, looking from the left toward the right in that figure. Fig. 8 is an end elevation of the machine identical with Fig. 4, but shows a portion only on a somewhat larger scale than that to which Fig. 4 is drawn; this figure is intended to illustrate more fully the movement of the blank-holder. Fig. 9 is a view of a portion of the machine looking at the under side thereof at that end indicated by Fig. 8, the view being drawn to a scale similar to that to which the latter figure is drawn. Fig. 10 is a view looking from the rear of the machine toward that portion represented in Fig. 9. Fig. 11 is a perspective view of certain portions set forth in Fig. 10. Fig. 12 is a perspective view of a detail concerned in the feed of the blank toward and its movement away from the die which it is designed shall operate upon it. Fig. 13 is an edge view of a certain latch frame. Fig. 14 is a view looking toward the under side of the latch frame as depicted in Fig. 13, part being in section. Fig. 15 shows latch-tripping-mechanisms adapted to occupy positions in the latch frame set forth in Figs. 13 and 14, the purpose of this figure being to illustrate the relation of these mechanisms to each other and to certain latch-tripping mechanism actuators. Fig. 16 is a perspective view of one of these latch-tripping mechanisms. Fig. 17 is a diagrammatic view illustrating the mode of operation of certain mechanism designed to produce an alteration in the rapidity of movement of a die during its progressive motion toward and away from a blank supported in the blank-holder.

Similar characters of reference designate corresponding parts in all the figures of the drawings.

In carrying out my present invention the instrumentalities for giving shape and size to the various types may be simple dies and these instrumentalities are designed to so operate upon the type-formable material as to tend to force the surplus portion sheared from the successive type-blocks in a direction transverse to the blank, and hence away from an adjacent type field.

In forming a series of consecutive types along a blank to produce a typebar by the use of appropriate dies, although that portion of the edge of the blank under the working die is supported on one side by the adjoining stock of the blank, on the other side, however, assuming that a type has already been there formed, the formative stresses arising from the advancement of the die has a detrimental effect, tending to cause a distortion of the type field and a more or less complete displacement of the type. For the purpose of protecting the field of this formed type from the effects resulting from the action of the die, I make use of a wall against which the flowage induced by the advancing die is received, and which serves to confine the action of the die on that side to the mass of the type-formable material being formed into a type-block surmounted by a type-face. This wall may consist of a plate or knife edge, and preferably enters the edge of a blank slightly in advance of the die to insure its satisfactory action. It may be operated as well independently of the die since it is manifest that the purposes fulfilled by the die and the wall are distinct and separate. In practice, however, I find it convenient to make this wall or abutment in the form of a projecting lip or fin at the side of and connected or integral with the die, and have so represented it in the drawings attached to the present specification. For practical purposes, also, a number of different dies designed for successive action are necessary for making a typebar having a series of composed types on its edge. These dies may be brought into proper operative relation to the blank by any suitable means and in any suitable way, but in carrying out my present invention the die or a plurality of the same are preferably conveyed periodically past the operative point. For this purpose the dies may be mounted upon a carrier, which may conveniently be a rotary carrier or turret. Such a form of carrier is illustrated in the drawings accompanying this specification, designated in a general way by T, and as shown is supplied with a driving-shaft 2, rigid at one end with a disk 3, adapted to rotate in a bearing formed in the head or extension 4, projecting laterally from an upright $b'$ erected upon the base-frame B of the machine. This base-frame B may be of any suitable form and construction to support the operative parts of the machine and is shown supplied with legs $B^1$. Adjacent to the opposite end of the shaft 2 the latter may be journaled in a bearing formed in or supported by an upright or pedestal $b^2$. In the event that a plurality of dies or other instrumentalities are to be employed, they may be conveniently mounted upon the periphery of one or more wheels. Two such wheels are shown which, with their respective dies, designated generally by C, will hereinafter be referred to as die-wheels and designated by 5 and 5. This number of wheels is chosen for the purposes of the present illustration by reason of the fact that the present machine is particularly adapted for securing an appropriate operation of the dies when so mounted. The afore-mentioned wall or abutment is shown in the present drawings as a flange 5', arranged adjacent to the set of dies on each die-wheel 5, and a flange $5^2$ is also shown in the present case upon the other side of the dies. This latter flange $5^2$ is adapted to make a slot in the edge of the blank in advance of the type which is being formed, which slot may be of greater width than the retaining flange 5' thus forming a flowage space when the blank and die-wheel are relatively shifted to bring the retaining flange 5' thereinto in forming the next type.

It is evident from what has already been stated that the purpose fulfilled by the retaining flange 5' is the protection of the adjacent type involving the control of the flowage, and a restriction of the flow to a direction laterally of the bar. When a die and the blank are brought in position to form a type and pressed together for this purpose, those portions of the retaining flange adjacent to the die operating to produce a type in a manner referred to at length later on tend to define the field of action of the die and confine the material therein endwise of the bar, permitting, however, the surplus material sheared off during the forming process to flow toward the sides of the blank from which latter it may afterward be trimmed or removed by any suitable means to bring the sides of the bar into substantial parallelism. Now, support for the material in the field of action of the working die may be afforded by the mass of unoperated-upon material lying contiguous to the possible contact area of the die on one or both sides thereof. In the latter case, that is, in making a type at a point removed from type already formed, it is manifest that, in so far as concerns the described function performed by the retaining flanges 5' and 5², the presence of these flanges are unnecessary, and hence they may be absent from the die-wheel. If, however, types are formed consecutively from end to end of the blank the support afforded by the unoperated stock will generally be at one side only of the field of action of the die, that is, in advance of the working die, in which case the die-wheel may have but one flange acting as a support to protect the type immediately at the rear. In illustrating an embodiment of the invention in the present machine, it will be understood that all such modifications come within the purview of the invention.

In the operation of the present machine it is designed that a particular die selected from among those upon either die-wheel 5 and 5 shall be brought into a position by the movement of the turret T, in which it can coöperate with the edge of the blank to form a type thereon, and to permit of this each die-wheel may be fixed to an appropriate shaft 6, rotatably mounted on the turret. As here shown each shaft is journaled in the disk 3 and also in a corresponding cross-arm 7 secured to the shaft 2 of the turret. Rotation may be imparted to each shaft 6 through the medium of a corresponding gear-wheel 8. In the present instance it is not contemplated that either die-wheel 5 shall be shifted axially from an operative to an inoperative position and back again, but that the die-wheels shall lie in substantially the same plane transverse to the axis of rotation of the turret T whether they are in an idle or operative position. In order therefore to render each gear-wheel 8 operative to rotate its respective shaft 6 it is according to the present construction secured to a sleeve 9 encircling the shaft and fitted to slide lengthwise thereof, but compelling the shaft to rotate as a unit with it by some suitable construction connecting the two. For instance, such connection may comprise a flange 6ᵇ, extending from a hub portion 6ᶜ affixed to each shaft 6 in which are adapted to slide pins 9² extending axially from a flange 9ᵇ of the corresponding sleeve 9. A common driver for all the gear-wheels 8 may be provided, as in this instance, consisting of an internal gear-wheel 10, with the teeth of which each gear-wheel 8 is adapted to mesh when the sleeve 9 to which the gear-wheel is attached is shifted along its shaft from a position in which the gear-wheel is out of engagement with the driver.

Each sleeve 9 may be yieldingly retained in either one of its two axial positions by means of a corresponding spring-pressed detent, in the present case comprising a spring finger 11 secured to and extending from the flange 6ᵇ, and provided at its free end portion with a tooth (not shown) adapted to engage with the notches 11ᵇ, 11ᵇ, corresponding to the two axial positions of the sleeve. This lengthwise movement of each sleeve 9 to carry its gear-wheel 8 into and out of engagement with the driving-gear 10 may be effected in any suitable way. A construction for the purpose is set forth, which is rendered operative upon the initial rotation of its corresponding shafts 6 (accomplished in a manner that will presently be explained) and comprises a fixed actuating or cam member 12, with which is adapted to coöperate a co-acting member or cam-arm 13, extending from each sleeve 9 for shifting the sleeve in one direction, and a fixed actuating or cam member 14 with which is adapted to coöperate a co-acting member or cam-arm 15, extending from each sleeve 9 for shifting the sleeve in the opposite direction. In the present instance, the operative, or contacting surface of each arm 13 is located on an elastic or spring-like strip for the purpose of minimizing the shock when such surface comes into contact with the actuating member 12. Normally, that is, when the turret T is rotating, and no die-wheel 5 is rotating about its own axis relatively to the turret during its revolution about the axis of the turret, the position of the several arms 13 and 15 is not such as to cause their contact with the corresponding actuating members 12 and 14. When, however, a sleeve 9 has been set in rotation, referred to at length later, the arm 13 on a rotating sleeve will be brought at some time during the revolution of the turret T into contact with the actuating member 12, whereupon, by reason of the continued rotation of the sleeve with its shaft 6 about the axis of the latter, and their revolution about the axis of the turret, the actuating member shifts the sleeve axially along the shaft and carries the corresponding gear-wheel 8 into engagement with the driving-gear 10. After the die-wheel 5 affixed to this particular shaft 6 has passed the point where its die performs its work upon the typebar-blank, the arm 13 extending from the sleeve on the shaft will pass out of contact with the actuating member 12, which action is followed by the contact of the arm 15 of that sleeve with the actuating member 14 before the turret has completed its rotation. Subsequently to this contacting of the arm 15 the continued rotation and revolution of the shaft results through the action of the actuating member 14 in the axial shifting of the sleeve in the opposite direction and the carrying of the gear-wheel 8 out of engagement with the driving-gear 10.

It is essential for the correct operation of the present machine that, when any die-wheel 5 comes to rest rotarily its rotative position relatively to the turret should be a fixed and definite one, and the same whenever and however it may be rotated. To attain this result some form of what I may term a precision-brake may be associated with the rotative parts on the turret. For instance, a plunger 16, one for each shaft 6, fitted to the bore of a corresponding cylindrical extension 17, projecting radially from a fixture 18 on the shaft 2 may be pressed outwardly by a spring 19 against the shaft, see Fig. 2, operating when the gear-wheel 8 on the shaft has been shifted axially and disengaged from the driving-gear 10 to retard the movement of the shaft and bring the same to rest with the end of the plunger in contact with a flattened portion or facet on the shaft.

The period during which the type-forming operation occurs in the present machine is that corresponding to a temporary cessation in the progressive movement of the die toward and from the type-forming point and while the blank is in contact with the die on the die-wheel at and adjacent to the lowest point or cusp of the cycloidal path which it traces, see Fig. 8. The two die-wheels 5 and 5 are shown in the present instance disposed on diametrically opposite sides of the turret T, and for effecting this dwell in the rotary movement of the turret at the end of each semi-rotation thereof with a particular die at the type-forming point as stated above, the following described mechanism may be employed. The main driving-shaft S is journaled in suitable bearings, here shown to be provided in a pedestal $b^3$, the pedestal $b^2$ mentioned as sustaining the turret shaft 2, and the upright $b'$ already referred to. To this driving-shaft S is secured a driving pulley 20 by means of which the shaft may be rotated from any source of power, and there is also affixed to the shaft a gear-wheel 21, which serves to drive through an engaging gear-wheel 22 a pinion 23, whose axis as illustrated is coincident with the axis of the shaft 2 of the turret T. Motion is imparted in the present instance to the shaft 2 of the turret to effect an intermittent rotary movement of the latter by means of an intermediate differential train comprising a gear-wheel 24 meshing with said pinion 23 and an internal gear-wheel 25 attached to the turret shaft 2. This gear-wheel 24 is adapted to be swung in a circular arc whose center lies in the axis of the pinion 23, and for this purpose it may be rotatably mounted on an arm 26 whose hub portion $26^b$ is rotatably fitted to the exterior of the shaft 27 connecting the gear-wheel 22 with the pinion 23, about which shaft 27 the arm may be oscillated to carry the gear-wheel 24 to and fro in the annular space between the pinion 23 and the internal gear-wheel 25. To securely support the several parts an extension $c$ on the supporting shaft $27^a$ secured to the shaft 27 and journaled in the upright $b^2$ is shown occupying a position in an axial opening formed in the end of the turret shaft 2. The arm 26 may be oscillated as aforesaid by means of a crank and crank-pin provided on the main driving-shaft S, and which, taken together are designated generally herein by 28. A connecting-rod 29 places this crank 28 in operative connection with a projecting arm 30 of the hub portion $26^b$ of the arm 26. The action of this transmitting device will be readily understood upon reference to the diagrammatic view of Fig. 17 with the aid of the following explanation. It should be stated at the outset that the diameters of the gear-wheels 21 and 22 are equal, hence the pinion 23 will revolve at the same rate as the main driving-shaft S.

Referring now to the diagrammatic view, $s'$ represents the intersection of the axis of the driving-shaft S with the plane of the paper on which the view is depicted, and $25'$ the corresponding intersection of the axis of the internal gear-wheel 25, which axis, as before stated, coincides with the axis of the pinion 23, and also that of the turret shaft 2. The pitch circle of the gear-wheel 21 on the main driving-shaft S is represented by the dotted circle $21^a$, $21^b$, $21^c$, and the pitch circle of the engaged gear-wheel 22 by the dotted circle $22^a$, $22^b$, $22^c$. The pitch circle of the internal gear-wheel 25 is represented by the dotted circle $25^a$, $25^b$, $25^c$, and the pitch circle of the pinion 23 by the dotted circle $23^a$, $23^b$, $23^c$.

Six arbitrary positions of the crank 28 on the main driving-shaft S are chosen for the purpose of illustrating the action of the device, and they are conveniently taken so as to show collectively the progressive movement of the crank through 360 degrees of arc; these positions are indicated by $x'$, $x^2$, $x^3$, $x^4$, $x^5$, $x^6$, and the corresponding positions of the pivotal axis of the joint between the connecting-rod 29 and the arm 30 (this arm being indicated in dotted outline for its corresponding positions) are represented by $y'$, $y^2$, $y^3$, $y^4$, $y^5$, $y^6$, respectively. Assuming the driving-shaft S to be rotating in the direction of the arrow at the lower left-hand portion of the diagram, it is plain that the corresponding direction of rotation of the pinion 23 will be in the direction of the arrow adjacent to the circle $23^a$, $23^b$, $23^c$ representing its pitch line. Hence, the direction of rotation imparted to the intermediate gear-wheel 24 will be left-hand, contrary to the direction of movement of the hands of a watch when its axis is in the position indicated by $z'$ corresponding to the mentioned positions $x'$ and $y'$. The pitch circle of this intermediate gear-wheel 24 is represented also in dotted outline, the figure indicating various positions assumed by it for certain positions of the crank 28. If, now, there were no translational movement of the axis of this intermediate gear-wheel 24, the internal gear-wheel 25 would be rotated continuously in the same direction as the former wheel, but since, as already explained, the arm 26 is adapted to be oscillated by the crank 28, a movement of the latter through a distance represented by the arc $x'—x^2$ will move the mentioned pivotal axis of the connecting-rod joint from $y'$ to $y^2$, and carry the center of the intermediate gear-wheel from $z'$ to $z^2$, that is, in the direction that the described rotation of the intermediate gear-wheel 24 tends to turn the internal gear-wheel 25. This movement of the crank from $x'$ to $x^2$ corresponds to one-sixth of the full rotation of the main shaft, and since the pinion 23 rotates at the same speed as this shaft, as already explained, and the internal gear-wheel 25 in this case is twice the diameter of the pinion, the internal gear-wheel will be rotated one-twelfth of a turn, leaving out of account the swinging of the intermediate gear-wheel. Taking this circular translational movement of the axis of the intermediate gear-wheel into account, the one-twelfth rotation of the internal gear-wheel 25 will be increased by the angular movement corresponding to the arc $z'—z^2$ as the intermediate gear-wheel rolls over the pinion. For a further one-sixth rotation of the main driving-shaft S through the arc $x^2—x^3$, the said pivotal axis of the connecting-rod joint will move from $y^2$ to $y^3$, and the internal gear-wheel 25 will be given an additional one-twelfth of a turn plus the added fraction of a complete rotation, due to the swinging of the intermediate gear-wheel center from point $z^2$ to point $z^3$; therefore, for two-sixths of a full rotation of the driving-shaft S the internal gear-wheel 25 will be rotated two-twelfths of a rotation, plus that fraction of a rotation due to the rolling of the intermediate gear-wheel as its center moves through the arc $z'—z^3$. When the first portion of the next one-sixth rotation of the crank 28 has occurred it will take the position $x^t$, and the pivotal axis of the connecting-rod joint will be moved to the position $y^t$, shifting back again to the position $y^4$ upon the completion of the one-sixth rotary movement with the crank at the point indicated by $x^4$. The position of the intermediate gear-wheel center corresponding to this position $y^4$ is $z^4$, there being consequently a further net rotative movement given to the internal gear-wheel 25 of one-twelfth of a full turn plus that fraction of a turn due to the rolling of the intermediate gear-wheel as its center moves through the arc $z^2—z^4$. The main driving-shaft S has now rotated one half of a full turn, while the internal gear-wheel 25 has made three-twelfths or one-quarter of a rotation plus that fraction of a rotation due to the rolling of the intermediate gear-wheel as its center moves through the arc of a rotation $z'—z^4$.

Now the angular movement imparted to the internal gear-wheel 25 by reason of the swinging and consequent rolling of the intermediate gear-wheel 24 as its center moves from $z'$ to $z^4$ is represented by the sum of the angle subtended by the arc $z'—z^4$ and the angle subtended by that arc of the pitch circle of the pinion 23 over which the intermediate gear-wheel 24 rolls in the moving of its center from $z'$ to $z^4$ after this arc has been laid off on the pitch circle of the internal gear-wheel 25. The throw of the crank 28 and the length of the arm 30 are such that these two angles are together approximately equal to 90 degrees, that is, they correspond to one-quarter of a turn of the internal gear-wheel 25. Hence for that particular semi-rotation of the crank 28 considered the turret shaft will be rotated a half turn. For the next one-sixth rotation of the crank, that is, from $x^4$ to $x^5$ the corresponding movement of the pivotal axis of the connecting-rod joint will be from $y^4$ to $y^5$, carrying the intermediate gear-wheel center from $z^4$ to $z^5$, that is, in a direction the reverse of that in which the rotation of the intermediate gear-wheel 24 tends to turn the internal gear-wheel 25. The conditions are now reversed, the rotative movement due to the swinging of the intermediate gear-wheel 24 which before was added to that due to the effect of the rotating pinion 23 acting now to diminish this latter effect. The relation of the various engaging gear-wheels and other parts concerned are such as to cause the tendency to reverse the rotation arising from the rolling of the intermediate gear-wheel 24 over the pinion 23 as its center moves through the arc $z^4—z^5$ to be approximately equal to one-twelfth of a full turn of the internal gear-wheel 25; hence, as the rotative movement of the intermediate gear-wheel, due to the rotation of the pinion 23 is in amount such as to turn the internal gear-wheel one-twelfth of a complete rotation, the internal gear-wheel will simply roll backward along the teeth of the internal gear-wheel and cause substantially no movement of the latter. For a similar reason substantially no movement of the internal gear-wheel occurs for the next similar fraction of rotation of the crank, that is, from $x^5$ to $x^6$, resulting in a movement of the pivotal axis of the connecting-rod joint from $y^5$ to $y^6$, and the transfer of the intermediate gear-wheel center from $z^5$ to $z^6$. During the first portion of the last one-sixth of a rotation of the crank, that is, from $x^6$ to $x^v$, the pivotal axis will move to the position $y^v$, returning to the position $y'$, however, at the completion of the full rotation of the crank. The final position of the center of the intermediate gear-wheel 24 will be at $z'$, having moved backward, that is, in the opposite direction to that in which the internal gear-wheel 25 rotates as represented by the arrow, a distance represented by the arc $z^6$—$z'$, causing as a result the internal gear-wheel to rotate forward a full one-twelfth of a rotation minus that fraction of a rotation due to the rolling of the intermediate gear-wheel as its center moves through the arc $z^6$—$z'$. This completes the second semi-rotation of the crank 28 and it will be evident from what has been said in a preceding paragraph relative to the effect produced by the rolling of the intermediate gear-wheel 24 over the pinion 23, since its effect is reversed in the second semi-rotation for each full rotation of the crank, the internal gear-wheel 25 makes but a half turn. In other words, during the translational movement of the intermediate gear-wheel center from $z'$ to $z^4$, the internal gear-wheel 25, and consequently the turret T which is rotated thereby, turns on its axis. The speed of this movement of the turret begins to slacken, however, as the intermediate gear-wheel center nears the position $z^4$ and is rapidly reduced to zero as the intermediate gear-wheel swings in the opposite direction, that is, from $z^4$ toward $z'$, until as the intermediate gear-wheel center approaches the latter position $z'$, the rotative movement of the internal gear-wheel accelerates and increases in rapidity which it continues to do as it passes this point and the translational motion of its center is reversed; the complete oscillation of the intermediate gear-wheel 24 during the complete rotation of the driving-shaft S, causes the internal gear-wheel 25 to lose such a fraction of a rotation as the intermediate gear-wheel swings in one direction as it gains when it swings in the opposite direction. It is during this temporary suspension of the rotarial movement of the turret T that the type-forming operation takes place, and to permit of this being properly done the two die-wheels 5 and 5 shown are so disposed on the turret that they shall come successively and at such periods into appropriate relation to a blank held in a suitable blank-holder referred to at length later herein.

Mechanism will now be described for effecting the initial rotation of the die-wheels at predetermined points in the plane of their rotation, whereby any particular die upon either of the wheels may be caused to assume its proper position with respect to the blank to enable it to form a type thereon. This mechanism comprises, as herein shown, a starting-arm 31 on each shaft 6 having a resetting heel $31^h$, the construction and operation of each of which arms may be such as set forth in Patents No. 401,371 and 573,620, granted to me on April 16, 1889, and December 22, 1896, respectively, which patents may be consulted for a more detailed description. Designed to coöperate with these starting-arms 31, 31 are a number of latches, designated generally by 32, see particularly Fig. 6, located in suitable openings in a latch frame 33, with their inner ends disposed substantially concentric about the turret-shaft 2. Normally each latch 32 is in a retracted position with its end removed from the path of both starting-arms 31, 31, permitting thus the free rotation of the turret without causing the engagement of either starting-arm with a latch. Each latch 32 may be held in this retracted position against the tension of a spring 34 (designed to project the latch forward when tripped) by a shoulder $32^b$, which contacts with the edge of an opening in the latch frame through which the latch extends. Each spring 34 is secured to suitable pins $32^c$, $32^c$, one upon the latch and the other upon the latch frame 33, while a stop 35 on the latch limits the inward movement of the latter. When a latch is pushed outward to reset it after having been tripped the engagement of the shoulder $32^b$ is insured by a spring $34^b$, operating to move the latch transversely of its opening in the latch frame.

Mechanism for tripping the latches 32 may be as follows: Each such tripping mechanism is shown to be operative from a separate rock-lever 36. The series of rock-levers 36 may be fulcrumed intermediate their ends to a rod $36^b$, supported in a bracket $36^c$ beneath the base frame B, see Fig. 3, and each lever carries a key $36^d$ for operating it, which key, in the present case, is located upon the transversely-bent outer end-portion of the lever. To each rock-lever 36 there is connected, by means of a link 37, an actuator 38, consisting, as herein shown, of a curved rod located and slidable in a corresponding slot formed in the outer shell $36^b$ of the latch frame 33. There will be an actuator corresponding to the type or space forming die or a space upon a die-wheel 5, to which each operating key $36^d$ is referable, and the series of actuators 38 may be held in place in the latch frame 33, by means of cross-pieces $38^b$, extending from side to side of the latch frame and secured to the side frames $33^c$, $33^c$, to which the latch frame is also secured and which are erected from the base frame B.

The latch frame 33 has, in the present instance, a center web $33^d$, from which extends on each side flanges $33^e$, $33^f$, provided with suitable openings, to receive the latches 32. These latches on each side of the web $33^d$ are held in place by plates $33^g$, $33^h$, respectively. The movement of each actuator 38 in one direction may be limited by a projection 38$^c$ thereon, and its movement in the opposite direction by a projection 38$^d$, each of which projections is adapted to co-act with a fixed portion of the machine. Springs 39 are provided for returning the actuators after they have been caused to operate by their respective rock-levers 36. As shown in the present illustration, the motion of an actuator 38, due to the operation of its connected rock-lever 36, is transmitted to its corresponding latch 32 by the following means.

Adjacent to each latch 32 extends a rock-shaft 40, journaled in the web 33$^d$, and the side frame 33$^c$ on that side and operatively connected to its actuator 38 by means of an arm, designated generally by 41, which enters a notch 41$^b$ in the actuator. This arm 41 serves to vibrate the rock-shaft 40 with which it connects by a to and fro movement of the actuator. From each rock-shaft 40 extends a tripping-arm 42 having a laterally projecting portion 42$^b$, adapted to contact with a latch 32 and move it to release the shoulder 32$^b$ and permit the spring 34 to project the latch inward. In the present instance the tripping arm, 42 passes through an opening in the flange 33$^e$ of sufficient dimensions to permit of its vibration.

The openings in the center web 33$^d$ of the latch frame 33 through which the several tripping arms 42 extend to connect with the actuators 38 may be formed by recessing the web on its inner side with a number of slots, see 33$^m$, each extending in the direction of the latch frame axis to a distance that will permit the arm opposite any given slot to be connected with that actuator which is designed for its operation.

By referring to Fig. 15, which shows the relation existing in the present machine between the several arms 41 and 42, and the actuators 38, it will be noticed that all the tripping arms 42 on the same side of the web 33$^d$ are located in the same plane, but that the arms 41 on the seven lower shafts 40, as represented at the left of the figure and on the six lower shafts as indicated on the right of the figure, are in different planes transverse to the shafts thereby bringing each arm into the plane of its actuator 38 indicated at the upper portion of the figure. The three upper arms 41 at each side are, however, in the same transverse plane as the one extending from the corresponding fourth shaft 40, counting downward, and to enable the arms of these upper shafts to be connected with their proper actuators each arm may be provided with a suitable extension or offset, see 41′, 41$^2$, 41$^3$, of a length sufficient to permit it to reach and enter the notch 33$^m$ in its actuator as aforesaid, each offset being provided with one or more notches as indicated to enable it to clear intermediate actuators.

A feature of the present invention is the production of a type by a rolling operation brought about or resulting in the present instance through the impartation of an oscillatory movement to one of the two members (consisting of the blank and the die) whereby the type-formable material is subjected to a succession of actions operating to form a type by a series of reductions. Such oscillatory movement takes place during at least a portion of the period occupied in the formation of a type, and results in the forging and swaging of the material into a compact, durable and sharply defined type or character. The mechanism set forth in the drawings attached to the present specification is adapted to accomplish this alternating movement in a curvilinear path about a fixed axis. The member adapted to have this oscillatory movement is, in the present instance, the blank whose edge is subjected to the action of the dies, and such oscillation also occurs as herein set forth during a comparatively quiescent condition of a working die, so far as any coincident harmonious movement thereof coöperating with the movement of the blank is concerned. Such curvilinear movement of the member may be described as a rolling movement, and the direction thereof is crosswise of the blank; that is, transverse to a line joining the type which is being formed at any time and an adjacent type or an adjacent mass of material upon the edge of the blank. This rolling movement operates not only to produce a wrought type by forging and swaging a mass of the material into a type having an impression face or sharp definition, compacted and condensed, and supported upon a wrought column possessing like characteristics as the latter of those just mentioned but accomplishes as well a lateral or crosswise movement or flow of the material in excess of the quantity needed for a finished type and type-block. Particularly does this movement of the material laterally of the blank result most advantageously during the production of successive types along the blank, if the retaining walls before adverted to are used in conjunction with the type-forming dies. The excess material is rolled toward the sides of the blank, and any portions projecting beyond the planes of the sides may afterward be removed by suitable means.

The blank for forming the typebar is made from some suitable type-formable material, that is, a material of appropriate composition which is brought into the desired form by suitable means. The blank may be cast but preferably will be reduced to shape by suitable means operating to form a wrought metal bar of a length corresponding to the length of a typebar. The blank may, however, be made in the form of a continuous strip or rod, which is afterward cut to the proper lengths.

Referring now to the mounting of a blank for permitting its oscillation and the mechanism for producing the same as herein above set forth, 42 is a holder for the blank in the form of a cradle. A blank designated generally by V may be removably secured in the slot 42ᵛ, in this holder 42 by some suitable means, that herein shown for instance, comprising screws 43, 43 adapted to force the blank against the side of the holder. The axis of oscillation of the holder 42 is defined by the shaft 44 at each end, which is journaled in a corresponding block 44ᵇ. This axis of oscillation is located adjacent to the impression face of the finished type and preferably just below that face. An oscillation of the desired character is imparted to the holder 42 by any suitable means, and is of such an amplitude as not to disrupt or weaken the type block where it is connected with the body of the blank V. The oscillatory movement imparted to the blank may continue during the whole period of each individual type formation, or it may last for only a portion of such period, while it may or may not be uniform throughout its continuation with respect to its amplitude of oscillation and its periodicity. It may, however, differ, in either one or both of these respects, but will preferably diminish in amplitude during the final stages of the completion of a type. A mechanism for imparting such varying oscillatory movement to the holder 42 and a contained blank is set forth, comprising a crank pin 45 extending from a disk 45ᵇ, affixed to a shaft 46, journaled in suitable bearings and rotated by means of engaging gear-wheels 47 and 48, from a shaft 49, driven by the internal gear 50, mounted within the driving pulley 20 and meshing with a gear-wheel 51 secured to the shaft 49. Rotation of the shaft 46 serves to revolve the pin 45 which enters a slot 51' in a vibratory arm 52 mounted upon a pivotal support 52ᵇ and effects the vibration thereof.

Slidably mounted upon the vibratory arm 52 is a block 53, to which is pivoted a link 54, jointed at the opposite end to an arm 55 of a rock-shaft 56. From this shaft 56 there extends a second arm or oscillator 57, which, when the rock-shaft 56 is actuated serves to oscillate the blank-holder 42 through the medium of an arm 58, projecting from the holder. As it is designed in the operation of the machine that the holder 42 shall have a step-by-step, longitudinal feeding movement to bring successive portions of the contained blank to the type forming point the oscillator 57 is shown extended lengthwise of the rock-shaft 56 for the purpose of maintaining connection with the arm 58 during such lengthwise feeding movement, see Fig. 10. It is manifest from this construction that when the slidable block 53 occupies a position removed from the axis of vibration of the arm 52, that an oscillatory movement will be imparted to the blank holder 42 during the rotation of the main driving pulley 20, which oscillation will be of uniform amplitude for any given position of the block. If, however, this block occupies a position in which the pivotal axis of the connection of the link 54 therewith corresponds to the axis of vibration of the arm 52, no oscillation will be imparted to the blank holder, and the amplitude of oscillation of the latter will increase as the block is moved outward toward the end of the arm. The construction shown permits the block 53 to be shifted to and fro along the vibratory arm 52, and it comprises a rock-shaft 59 suitably mounted and provided with an arm 60 connecting a link 61 to the slidable block 53. Rigid with the rock-shaft 59 is a cam arm 62, a roller or lateral projection 63 of which is adapted to bear against a cam 64. This cam 64 is attached to the main driving-shaft S, and is of suitable form to produce the appropriate movement of the rock-shaft 59 and shift the block 53 to effect the desired variation in the oscillatory movement of the blank-holder 42. A spring 59ᵇ maintains the roller 63 in contact with the cam 64.

The operation of a die upon the blank to form a type takes place while the edge of the blank is under the pressure of the die, and to bring about this result, mechanism is shown for causing a relative movement of the die and blank toward each other. Such movement which may be characterized as a transverse feeding movement may be coextensive in duration with the period consumed in the production of a completed type progressing uniformly from beginning to the end of a type-forming period, or such transverse feeding movement may be limited to a portion or portions only of such period and it may continue longer than the oscillation and vary in any desired manner. Preferably, however, the feeding movement will continue somewhat longer than the oscillatory movement of the blank to assist in the final placing of the type, as it were, and the formation of a perfectly level face to the impression surface thereof, and such movement will also decrease in speed during the later stages of the type-forming operation. The transverse feeding movement in the present case is imparted to the blank by mounting the blocks 44ᵇ, 44ᵇ in corresponding guideways 65ᵇ, 65ᵇ in the side portions or uprights 65ᶜ, 65ᶜ of the carriage 65, so designated by reason of the fact that it is susceptible of a lengthwise movement to bring successive portions of the edge of a contained blank to the type-forming point. Located in the carriage 65 and adjacent to each block 44$^b$ is a slide-bar 66, each having a tongue or rib 67 inclined to the direction of movement of the bar and adapted to slide the blocks 44$^b$, 44$^b$ in unison with each other to and fro in their guideways 65$^b$, 65$^b$ and move the blank into and out of operative relation with the dies. These slide-bars 66, 66 are actuated in the present instance by a cam 68 on the main driving-shaft S (see Figs. 1 and 5 particularly) through the medium of a cam roller 69, which bears against the cam and is mounted upon a link 70 connected to an arm 71 mounted upon a shaft 72, journaled in the carriage 65 and provided with pinions 73, 73, each meshing with a corresponding rack 74 formed or secured to the slide-bars 66, 66. The bifurcated end 70$^b$ of the link 70 is shown embracing the driving-shaft S to serve as a guide for the link, and since, as stated above, and more fully described below, the carriage 65 is capable of moving back and forth, the arm 71 may be located as shown between fixed journal portions 71$^b$, 71$^c$, for the shaft 72 and provided with an inwardly projecting pin, not shown, adapted to enter a longitudinal slot 72$^b$ in the pinion shaft 72, and thereby permit the shaft to move lengthwise but compelling its rotation when the arm 71 is swung by the rotation of cam 68. A spring 75 (see Figs. 1 and 9 particularly) is provided for urging the parts constantly in a direction opposite to that in which the cam 68 tends to move them.

The carriage 65 as already stated is adapted to have a lengthwise movement imparted to it, such movement being a step-by-step one in the direction of the slot 42$^v$ of the blank-holder 42 to bring portions of the edge of a blank therein successively into the plane of the die-wheels. The mechanism shown for this purpose comprises a feed disk corresponding to each die-wheel 5. In the present instance the gear-wheels 8, 8 perform the functions of such disks, each gear-wheel being notched on its radial face on that side toward which they move to engage the gear-wheel with the driver 10. These radial notches, designated generally by 76, may be of different radial depths, as shown in Fig. 5, to cause different amounts of feed movement corresponding to different widths of dies. Adapted to coact with the notches 76 upon either gear-wheel 8 when the same is shifted axially is a projection or pin 77 extending from a floating-arm 78, which is pivotally mounted upon a rock-arm 79 attached to a rock-shaft 80, journaled in suitable bearings supported upon the base frame B. In the operation of the machine such pin or projection 77 is adapted to enter a notch 76 and after contacting with the shoulder formed by the bottom of the notch cause the depression of the arm 78 by reason of the continued rotary and orbital movement of the gear-wheel. Such depression is participated in by the rock-arm 79 and causes the shaft 80 to rock in its bearings. Further movement of the gear-wheel rolls the pin or projection 77 out of the notch, while a spring-finger 81 attached to the floating-arm 78 and located between stops or pins 82, 82, seen in dotted outline Fig. 5, on each side of the spring-finger, causes the deflected floating-arm to resume its normal position with respect to the rock-arm 79. Assuming that the shaft 80 has been rocked in its bearing, such movement results, according to the present construction, in the partial rotation of a ratchet-wheel 83, loosely mounted upon the rock-shaft, through the medium of a spring-pressed pawl 84, pivoted to a pawl-carrying arm 85, extending from the shaft 80 adjacent to the opposite end of the turret T. Secured to this ratchet-wheel 83 is a gear-wheel 86, which serves to drive, through an intermediate gear-wheel 87, a gear-wheel 88 attached to a shaft 89 formed with a feed-screw 90. A spring 91 is provided for lifting the rock-arm 79 after its depression and causing the rock-shaft 80 to return to its normal or idle position after actuation, the pawl 84 sliding idly over the teeth of the ratchet-wheel 83 during this return movement.

Any suitable construction for effecting the lengthwise movement of the carriage 65 in its guides 92 from the rotation of the feed-screw 90 may be provided, that here illustrated comprising a nut 93, having oppositely-facing shoulders formed by end flanges 94, between which is located a dependent projection 95 of the carriage. If this projection 95 is made in such form as to be capable of being clamped to and unclamped from the nut 93 (a thumb-screw 96 being here shown for that purpose) upon unclamping or releasing the nut the carriage 65 may be moved back and forth by hand.

A space 97 may be provided on each die-wheel for the purpose of insuring the free revolution of the wheel about the axis of the turret out of contact with a blank in position in the holder 42. For forming such spaces as exist in ordinary composition between words and letters either or both die-wheels 5, 5 may be provided with a suitable die or dies operating when brought into position over the edge of the blank to roll off a portion of the edge and depress the surface at that point below the surface of the type faces. Such an operation may be brought about upon the actuation of the key marked "Space" in Fig. 1 in forming a depressed portion upon the edge corresponding to a space in composition in a manner and through mechanism readily understood from the preceding description.

A machine organized and constructed according to the foregoing operates substantially in the following manner: Assuming a blank to be clamped in position in the holder 42 by the screws 43, 43, and the main shaft S to be rotating in the direction of the arrow adjacent to the driving pulley 20, in Fig. 4, an intermittent or rotary motion will be imparted to a turret T in the same direction through the medium of the intermediate differential train, comprising the rotating and swinging intermediate gear-wheel 24 as already explained. Upon the depression of a key $36^d$ the corresponding actuator 38 is shifted in its guides against the tension of the corresponding spring 39, thereby rocking the particular shaft 40, with whose arm 41 the actuator engages and causing the tripping arm 42 of that shaft to unseat the shoulder $32^b$ of the corresponding latch 32, which latter is projected thereupon toward the revolving turret T by the attached spring 34 until brought to rest by the stop 35. The starting-arm 31 in the plane of that latch engages therewith when brought around into a position to impinge against it, rotating the die-wheel shaft 6 to which it is attached and causing the receding of the latch before leaving the same by the action of the resetting heel $31^h$ as fully set forth in my hereinbefore specified patents, such action to effect a return of the parts to their normal position being assisted by spring $34^b$. At some time during the swinging of the starting-arm 31 the coacting member or cam-arm 13 on the sleeve 9 of a rotating die-wheel shaft will contact with the actuating member 12. The continued swinging of the starting-arm 31, preceding its final separation from the reset latch 32, operates through these coöperating members in an engagement of the gear-wheel 8 with the driver 10 by which the rotation of the die-wheel shaft 6 is carried on during the further rotation of the turret T. The tooth on the spring finger 11 has coincidently sprung from the depression $11^b$ into the other depression $11^b$. The die-wheel 5 is ultimately brought to its lowest position with the die to which the operated key $36^d$ is referable in a position to act upon the blank. Preceding, however, its occupation of this position the pin or projection 77 upon the floating-arm 78 will have seated itself in a notch 76 on the shifted gear-wheel 8, and the feed-screw 90 will have been actuated in the manner already pointed out to feed the holder 42 and supported blank forward to bring the proper portion of the latter into appropriate relation to the die. The latter having now taken its correct position rotation of the turret T ceases temporarily through the action of the crank 28, and swinging-arm 26 carrying the intermediate gear-wheel 24 as explained. It is during this dwell in the motion of the die that the oscillator 57 is actuated through the shifting of the sliding-block 53 along the vibratory arm 52, by the action of cam 64 on the main shaft S.

It will be noticed that the gearing which transmits motion from the driving pulley 20 to the vibratory arm 52 is a speed-increasing arrangement, hence a rapid oscillation is imparted to the oscillator 57 as the block 53 is shifted forward and backward along the arm. In the preferred form and construction, as already pointed out this oscillatory movement imparted to the pivoted holder 42 from the oscillator diminishes in amplitude or swing during the later stages of a type formation. Simultaneously with this oscillatory movement of the holder 42 and contained blank, or for any desired portion thereof as explained, cam 68, upon the main driving-shaft S, operates through the cam link 70, arm 71, and engaging pinions 73, 73 and racks 74, 74 to slide the bars 66, 66, crosswise of the carriage 65 and move the blocks $44^b$, $44^b$ upward pressing the blank in the holder 42 against the die. The type is now formed by the die by a forging and swaging operation accompanied by the rolling of the excess material crosswise of the blank toward and beyond the sides thereof. Supposing now that a type has been formed and the turret T has resumed its rotary motion at some time thereafter, the coacting member 15 will contact with the actuating member 14. Before, however, this contact takes place the coacting member 13 will have passed out of contact with the actuating member 12 permitting, by the continued rotation and revolution of the die-wheel shaft 6, the coöperation of the former members to produce a return of the sleeve 9 to its normal position with the gear-wheel 8 attached to the shaft out of engagement with the driver 10. When this return movement of the sleeve 9 has been completed the tooth upon the spring-finger 11 snaps back into the other depression $11^b$ and retains the sleeve in this its normal axial position. The final positioning of the shaft 6 with its die-wheel 5 in correct position to be again actuated through the instrumentality of a projecting latch 32 is assured by the plunger 16 operating against the flattened portion of the main shaft S. This normal or idle position of each die-wheel 5 with respect to the turret T is, in the present machine, that of the removed or space portion 97 of the die-wheels at the outside, as indicated in Fig. 4, to insure freedom from contact of the die-wheels with the blank or typebar or types thereon as the turret rotates with the dies inoperative. Such substantially is the action of the parts when any key is struck to bring any particular die to the type-forming point, except that when the key marked "Space" is depressed to shift the blank, a die or die-like portion of the rotated die-wheel will be brought into juxtaposition to the blank. This die-like portion operates to produce a space as already explained.

In describing the action of the machine, the various springs which are provided for the purpose of returning actuated parts to the position from which they are moved as a result of actuation, have not been particularly referred to as they and their functions have been previously set forth.

Having described my invention, I claim—

1. The combination with a holder for a type-bar blank, of a die, means for producing a relative movement between the blank holder and the die upon an axis in the longitudinal plane of a blank in said holder to thereby subject such blank to a repeated treatment for causing the gradual working of excess material transversely to the line of said blank.

2. The combination with a type-bar blank holder, of a die, means for oscillating one of these about an axis parallel to the line of a blank in said holder to thereby induce flowage in such blank for causing the gradual working of excess material outward crosswise of the said line.

3. The combination with members consisting of a blank holder and a die, of means for confining the action of the die to a determinate portion of a blank in the holder, and means for oscillating one of the said members about an axis to thereby induce flowage in the blank and cause the gradual working of the excess material outward.

4. The combination, with a blank-holder, of a die, means for confining the action of the die to a determinate portion of a blank, and means for oscillating the blank holder about an axis to thereby induce flowage in a blank in the holder and cause the gradual working of excess material outward crosswise of the blank.

5. The combination with members consisting of a blank holder and a die, of means for oscillating one of said members about an axis adjacent to the impression face of the forming type to thereby induce flowage in a blank in the holder and cause the gradual working of excess material outward.

6. The combination with members consisting of a blank holder and a die, of means for oscillating one of said members about an axis disposed longitudinally of the blank holder to thereby induce flowage in a blank in the holder and cause the gradual working of excess material outward crosswise of the blank.

7. The combination with members consisting of a blank holder and a die, of means for confining the action of the die to a determinate portion of a blank in the holder, and means for oscillating one of said members about an axis adjacent to the impression face of the forming type to thereby induce flowage in the blank and cause the gradual working of excess material outward.

8. The combination with members consisting of a blank holder and a die, of means for confining the action of the die to a determinate portion of a blank in the holder, and means for oscillating one of said members about an axis disposed longitudinally of the holder to thereby induce flowage in the blank and cause the gradual working of excess material outward crosswise of the blank.

9. The combination with members consisting of a blank holder and a die, of means for oscillating one of said members about an axis fixed with respect to one of the members and movable with relation to the other to thereby induce flowage in a blank in the holder and cause the gradual working of excess material outward.

10. The combination with members consisting of a blank holder and a die, of means for oscillating one of said members about an axis disposed longitudinally of the blank holder and fixed with relation to one of the members and movable with relation to the other to thereby induce flowage in a blank in a holder and cause the gradual working of excess material outward crosswise of the blank.

11. The combination with members consisting of a blank holder and a die, of means for confining the action of the die to a determinate portion of a blank in the holder, and means for oscillating one of the said members about an axis fixed with respect to one of the members and movable with relation to the other to thereby induce flowage in the blank and cause the gradual working of excess material outward.

12. The combination with members consisting of a blank holder and a die, of means for confining the action of the die to a determinate portion of a blank in the holder, and means for oscillating one of said members about an axis disposed longitudinally of the blank holder and fixed with respect to one of the members and movable with relation to the other to thereby induce flowage in the blank and cause the gradual working of excess material outward crosswise of the blank.

13. The combination of a blank holder with a die, and means for oscillating one of said members about an axis adjacent to the impression face of the forming type and fixed with respect to one of said members and movable with relation to the other to thereby induce flowage in a blank in the holder and cause the gradual working of excess material outward.

14. The combination of a blank holder with a die, and means for oscillating one of said members about an axis adjacent to the impression face of the forming type, disposed longitudinally of the blank holder, and fixed with respect to one of said members and movable with relation to the other to thereby induce flowage in a blank in the holder and cause the gradual working of excess material outward crosswise of the blank.

15. The combination with members consisting of a blank holder and a die, of means for confining the action of the die to a determinate portion of a blank in the holder and means for oscillating one of the said members about an axis adjacent to the impression face of the forming type and fixed with respect to one of the said members and movable with relation to the other to thereby induce flowage in the blank.

16. The combination with members consisting of a blank holder and a die, of means for confining the action of the die to a determinate portion of a blank in the holder, and means for oscillating one of the said members about an axis disposed longitudinally of the blank holder and fixed with respect to one of the said members and movable with relation to the other to thereby induce flowage in the blank and cause the working of excess material outward crosswise of the blank.

17. The combination, with a blank-holder, of a die, means for producing a relative transverse feeding movement of the die and blank-holder toward each other and means for imparting a subsidiary movement of oscillation to one of the members simultaneously with this feeding movement to induce flowage in a blank in the holder and cause the gradual working of excess material outward.

18. The combination, with a blank-holder, of a die, means for producing a relative transverse feeding movement of the die and blank-holder toward each other and means for imparting a subsidiary movement of oscillation about an axis disposed longitudinally of the blank holder to one of the members simultaneously with this feeding movement to induce flowage in a blank in the holder and cause the gradual working of excess material outward crosswise of the blank.

19. The combination, with a blank-holder, of a die, means for confining the action of the die to a determinate portion of the blank, means for producing a relative transverse feeding movement of the die and blank-holder toward each other and means for imparting a subsidiary movement of oscillation to one of the members simultaneously with this feeding movement to induce flowage in a blank in the holder and cause the gradual working of excess material outward.

20. The combination, with a blank-holder, of a die, means for confining the action of the die to a determinate portion of the blank, means for producing a relative transverse feeding movement of the die and blank-holder toward each other and means for imparting a subsidiary movement of oscillation about an axis disposed longitudinally of the blank holder to one of the members simultaneously with this feeding movement to induce flowage in a blank in the holder and cause the gradual working of excess material outward crosswise of the blank.

21. The combination, with a blank-holder, of a die, means for producing a relative transverse feeding movement of the die and blank-holder toward each other and means for imparting a subsidiary movement of oscillation to one of the members about an axis fixed with respect to one of the type-making members and movable with relation to the other simultaneously with this feeding movement to induce flowage in a blank in the holder and cause the gradual working of excess material outward.

22. The combination, with a blank-holder, of a die, means for producing a relative transverse feeding movement of the die and blank-holder toward each other and means for imparting a subsidiary movement of oscillation to one of the members about an axis disposed longitudinally of the blank holder and fixed with respect to one of the type-making members and movable with relation to the other simultaneously with this feeding movement to induce flowage in a blank in the holder and cause the gradual working of excess material outward crosswise of the blank.

23. The combination, with a blank-holder, of a die, means for confining the action of the die to a determinate portion of the blank, means for producing a transverse feeding movement of the die and blank-holder toward each other and means for imparting a subsidiary movement of oscillation to one of the members about an axis fixed with respect to one of the type-making members and movable with relation to the other simultaneously with this feeding movement to induce flowage in a blank in the holder and cause the gradual working of excess material outward.

24. The combination, with a blank-holder, of a die, means for confining the action of the die to a determinate portion of the blank, means for producing a relative transverse feeding movement of the die and blank-holder toward each other and means for imparting a subsidiary movement of oscillation to one of the members about an axis disposed longitudinally of the blank holder and fixed with respect to one of the type-making members, and movable with relation to the other simultaneously with this feeding movement to induce flowage in a blank in the holder and cause the gradual working of excess material outward crosswise of the blank.

25. The combination, with a blank-holder, of a die, means for producing a relative transverse feeding movement of the die and blank-holder toward each other and means for imparting a varying oscillatory movement to one of the members simultaneously with this feeding movement to induce flowage in a blank in the holder and cause the gradual working of excess material outward.

26. The combination, with a blank-holder, of a die, means for producing relative transverse feeding movement of the die and blank-holder toward each other and means for imparting a varying oscillatory movement to one of the members about an axis disposed longitudinally of the blank holder simultaneously with this feeding movement to induce flowage in a blank in the holder and cause the gradual working of excess material outward crosswise of the blank.

27. The combination, with a blank-holder, of a die, means for confining the action of the die to a determinate portion of the blank, means for producing a relative transverse feeding movement of the die and blank-holder toward each other and means for imparting a varying oscillatory movement to one of the members simultaneously with this feeding movement to induce flowage in a blank in the holder and cause the gradual working of excess material outward.

28. The combination, with a blank-holder, of a die, means for confining the action of the die to a determinate portion of the blank, means for producing a relative transverse feeding movement of the die and blank-holder toward each other and means for imparting a varying oscillatory movement to one of the members about an axis disposed longitudinally of the blank holder simultaneously with this feeding movement to induce flowage in a blank in the holder and cause the gradual working of excess material outward crosswise of the blank.

29. The combination, with a blank-holder, of a die, means for producing a relative transverse feeding movement of the die and blank-holder toward each other and means for imparting a varying oscillatory movement to one of the members about an axis fixed with respect to one of the type-making members and movable with relation to the other simultaneously with this feeding movement to induce flowage in a blank in the holder and cause the gradual working of excess material outward.

30. The combination, with a blank-holder, of a die, means for producing a relative transverse feeding movement of the die and blank-holder toward each other and means for imparting a varying oscillatory movement to one of the members about an axis disposed longitudinally of the blank-holder, and fixed with respect to one of the type-making members, and movable with relation to the other simultaneously with this feeding movement to induce flowage in a blank in the holder and cause the gradual working of excess material outward crosswise of the blank.

31. The combination, with a blank-holder, of a die, means for confining the action of the die to a determinate portion of the blank, means for producing a transverse feeding movement of the die and blank-holder toward each other and means for imparting a varying oscillatory movement to one of the members about an axis fixed with respect to one of the type-making members and movable with relation to the other simultaneously with this feeding movement to induce flowage in a blank of the holder and cause the gradual working of excess material outward.

32. The combination, with a blank-holder, of a die, means for confining the action of the die to a determinate portion of the blank, means for producing a relative transverse feeding movement of the die and blank-holder toward each other and means for imparting a varying oscillatory movement to one of the members about an axis disposed longitudinally of the blank holder and fixed with respect to one of the type-making members and movable with relation to the other simultaneously with this feeding movement to induce flowage in a blank in the holder and cause the gradual working of excess material outward crosswise of the blank.

33. The combination, with a blank-holder, of a die, means for producing an un-uniform relative transverse feeding movement of the die and blank-holder toward each other and means for imparting a subsidiary movement to one of the members simultaneously with this feeding movement to induce flowage in a blank in the holder and cause the gradual working of excess material outward.

34. The combination, with a blank-holder, of a die, means for producing an un-uniform relative transverse feeding movement of the die and blank-holder toward each other and means for imparting a subsidiary movement of oscillation to one of the members about an axis disposed longitudinally of the blank holder simultaneously with this feeding movement to induce flowage in a blank in the holder and cause the gradual working of excess material outward crosswise of the blank.

35. The combination, with a blank-holder, of a die, means for confining the action of the die to a determinate portion of the blank, means for producing an un-uniform relative transverse feeding movement of the die and blank-holder toward each other and means for imparting a subsidiary movement to one of the members simultaneously with this feeding movement to induce flowage in a blank in the holder and cause the gradual working of excess material outward.

36. The combination, with a blank-holder, of a die, means for confining the action of the die to a determinate portion of the blank, means for producing an un-uniform relative transverse feeding movement of the die and blank-holder toward each other and means for imparting a subsidiary movement of oscillation to one of the members about an axis disposed longitudinally of the blank holder simultaneously with this feeding movement to induce flowage in a blank in the holder and cause the gradual working of excess material outward crosswise of the blank.

37. The combination, with a blank-holder, of a die, means for producing an ununiform relative transverse feeding movement of the die and blank-holder toward each other, and means for oscillating one of the members about an axis fixed with respect to one of the type-making members and movable with relation to the other simultaneously with this feeding movement to induce flowage in a blank in the holder and cause the gradual working of excess material outward.

38. The combination, with a blank-holder, of a die, means for producing an ununiform relative transverse feeding movement of the die and blank-holder toward each other and means for oscillating one of the members about an axis disposed longitudinally of the blank holder, and fixed with respect to one of the type-making members and movable with relation to the other simultaneously with this feeding movement to induce flowage in a blank in the holder and cause the gradual working of excess material outward crosswise of the blank.

39. The combination, with a blank-holder, of a die, means for confining the action of the die to a determinate portion of the blank, means for producing an un-uniform transverse feeding movement of the die and blank-holder toward each other and means for imparting a subsidiary movement to one of the members simultaneously with this feeding movement to induce flowage in a blank in the holder and cause the gradual working of excess material outward.

40. The combination, with a blank-holder, of a die, means for confining the action of the die to a determinate portion of the blank, means for producing an un-uniform relative transverse feeding movement of the die and blank-holder toward each other and means for imparting a subsidiary movement of oscillation to one of the members about an axis disposed longitudinally of the blank holder simultaneously with this feeding movement to induce flowage in a blank in the holder and cause the gradual working of excess material outward crosswise of the blank.

41. The combination, with a blank-holder, of a die, means for producing an un-uniform relative transverse feeding movement of the die and blank-holder toward each other and means for imparting a varying subsidiary movement to one of the members simultaneously with this feeding movement to induce flowage in a blank in the holder and cause the gradual working of excess material outward.

42. The combination, with a blank-holder, of a die, means for producing an un-uniform relative transverse feeding movement of the die and blank-holder toward each other and means for imparting a varying subsidiary movement of oscillation to one of the members about an axis disposed longitudinally of the blank holder simultaneously with this feeding movement to induce flowage in a blank in the holder and cause the gradual working of excess material outward crosswise of the blank.

43. The combination, with a blank-holder, of a die, means for confining the action of the die to a determinate portion of the blank, means for producing an un-uniform relative transverse feeding movement of the die and blank-holder toward each other, and means for imparting a varying subsidiary movement to one of the members simultaneously with this feeding movement to induce flowage in a blank in the holder and cause the gradual working of excess material outward.

44. The combination, with a blank-holder, of a die, means for confining the action of the die to a determinate portion of the blank, means for producing an un-uniform relative transverse feeding movement of the die and blank-holder toward each other, and means for imparting a varying subsidiary movement of oscillation to one of the members about an axis disposed longitudinally of the blank-holder simultaneously with this feeding movement to induce flowage in a blank in the holder and cause the gradual working of excess material outward crosswise of the blank.

45. The combination, with a blank-holder, of a die, means for producing an un-uniform relative transverse feeding movement of the die and blank-holder toward each other and means for imparting a varying subsidiary movement of oscillation to one of the members about an axis fixed with respect to one of the type-making members, and movable with relation to the other simultaneously with this feeding movement to induce flowage in a blank in the holder and cause the gradual working of excess material outward.

46. The combination, with a blank-holder, of a die, means for producing an un-uniform relative varying transverse feeding movement of the die and blank-holder toward each other and means for imparting a varying subsidiary movement of oscillation to one of the members about an axis disposed longitudinally of the blank holder and fixed with respect to one of the type-making members and movable with relation to the other simultaneously with this feeding movement to induce flowage in a blank in the holder and cause the gradual working of excess material outward crosswise of the blank.

47. The combination, with a blank-holder, of a die, means for confining the action of the die to a determinate portion of the blank, means for producing an un-uniform relative transverse feeding movement of the die and blank-holder toward each other and means for imparting a varying subsidiary movement of oscillation to one of the members about an axis fixed with respect to one of the type-making members and movable with relation to the other simultaneously with this feeding movement to induce flowage in a blank of the holder and cause the gradual working of excess material outward.

48. The combination, with a blank-holder, of a die, means for confining the action of the die to a determinate portion of the blank, means for producing an un-uniform relative transverse feeding movement of the die and blank-holder toward each other and means for imparting a varying subsidiary movement of oscillation to one of the members about an axis disposed longitudinally of the blank holder and fixed with respect to one of the type-making members and movable with relation to the other simultaneously with this feeding movement to induce flowage in a blank in the holder and cause the gradual working of excess material outward crosswise of the blank.

49. The combination, with a blank-holder, of a die, means for producing a relative transverse feeding movement of the die and blank-holder toward each other decreasing in speed during the later stages of the movement and means for imparting a subsidiary movement to one of the members decreasing in extent during its later stages to induce flowage in a blank in the holder and cause the gradual working of excess material outward.

50. The combination, with a blank-holder, of a die, means for producing a relative transverse feeding movement of the die and blank-holder toward each other decreasing in speed during the later stages of such movement, and means for imparting a subsidiary movement of oscillation to one of the members about an axis disposed longitudinally of the blank holder simultaneously with the feeding movement decreasing in extent during its later stages to induce flowage in a blank in the holder and cause the gradual working of excess material outward crosswise of the blank.

51. The combination, with a blank-holder, of a die, means for confining the action of the die to a determinate portion of the blank, means for producing a relative transverse feeding movement of the die and blank-holder toward each other decreasing in speed during the later stages of such movement, and means for imparting a subsidiary movement to one of the members simultaneously with this feeding movement decreasing in extent during its later stages to induce flowage in a blank in the holder and cause the gradual working of excess material outward.

52. The combination, with a blank-holder, of a die, means for confining the action of the die to a determinate portion of the blank, means for producing a relative transverse feeding movement of the die and blank-holder toward each other decreasing in speed during the later stages of such movement and means for imparting a subsidiary movement of oscillation to one of the members about an axis disposed longitudinally of the blank holder simultaneously with this feeding movement decreasing in extent during its later stages to induce flowage in a blank in the holder and cause the gradual working of excess material outward crosswise of the blank.

53. The combination, with a blank-holder, of a die, means for producing a relative transverse feeding movement of the die and blank-holder toward each other decreasing in speed during the later stages of such movement and means for imparting a subsidiary movement of oscillation to one of the members about an axis fixed with respect to one of the type-making members and movable with relation to the other simultaneously with this feeding movement decreasing in extent during its later stages to induce flowage in a blank in the holder and cause the gradual working of excess material outward.

54. The combination, with a blank-holder, of a die, means for producing a relative transverse feeding movement of the die and blank-holder toward each other decreasing in speed during the later stages of such movement and means for imparting a subsidiary movement of oscillation to one of the members about an axis disposed longitudinally of the blank holder and fixed with respect to one of the type-making members and movable with relation to the other simultaneously with this feeding movement decreasing in extent during its later stages to induce flowage in a blank in the holder and cause the gradual working of excess material outward crosswise of the blank.

55. The combination, with a blank-holder, of a die, means for confining the action of the die to a determinate portion of the blank, means for producing a transverse feeding movement of the die and blank-holder toward each other decreasing in speed during the later stages of such movement and means for imparting a subsidiary movement to one of the members simultaneously with this feeding movement decreasing in extent during its later stages to induce flowage in a blank in the holder and cause the gradual working of excess material outward.

56. The combination, with a blank-holder, of a die, means for confining the action of the die to a determinate portion of the blank, means for producing a relative transverse feeding movement of the die and blank-holder toward each other decreasing in speed during the later stages of such movement and means for imparting a subsidiary movement of oscillation to one of the members about an axis disposed longitudinally of the blank holder simultaneously with this feeding movement decreasing in extent during its later stages to induce flowage in a blank in the holder and cause the gradual working of excess material outward crosswise of the blank.

57. In a typebar-machine, the combination, with a blank-holder for a line-of-type blank and dies suitable for forming a line of type, of means for producing a relative movement between a die and the blank-holder during a type-forming operation to induce flowage in that portion of a line-of-type blank in the blank-holder concerned in the forming of the type and cause the gradual working of excess material in a direction crosswise of the blank.

58. In a typebar-machine, the combination, with a blank-holder for a line-of-type blank and dies suitable for forming a line of type, of means for producing a relative movement alternating in direction between a die and the blank-holder during a type-forming operation to induce flowage in that portion of a line-of-type blank in the blank-holder concerned in the forming of the type and cause the gradual working of excess material in a direction away from an adjacent type.

59. In a typebar-machine, the combination, with a blank-holder and dies each provided with a side wall, of means for producing a relative movement between a die and the blank-holder during a type-forming operation to induce flowage in that portion of a blank in the blank-holder concerned in the forming of the type and cause the gradual working of excess material in a direction crosswise of the blank.

60. In a typebar-machine, the combination, with a blank-holder and dies each provided with a side wall, of means for producing a relative movement alternating in direction between a die and the blank-holder during a type-forming operation to induce flowage in that portion of a blank in the blank-holder concerned in the forming of the type and cause the gradual working of excess material in a direction crosswise of the blank.

61. In a typebar-machine, the combination, with a blank-holder and dies suitable for forming a line of type, of means for producing a relative rolling movement extending crosswise of the blank between a die and the blank-holder during a type-forming operation to induce flowage in that portion of a blank in the holder concerned in forming a type and cause the gradual working of excess material outward.

62. In a typebar-machine, the combination, with a blank-holder and dies suitable for forming a line of type, of means for producing a relative transverse feeding movement between a die and the blank-holder during a type-forming operation and means for simultaneously oscillating the one with relation to the other about an axis disposed longitudinally of the blank-holder to induce flowage in that portion of a blank in the blank-holder concerned in forming a type and causing the gradual working of excess material outward.

63. In a typebar-machine, the combination, with a blank-holder and dies suitable for forming composed types, of means for producing an un-uniform relative transverse feeding movement between a die and the blank-holder during a type-forming operation and means for simultaneously oscillating the one with relation to the other to induce flowage in that portion of a blank in the blank-holder concerned in forming a type and causing the gradual working of excess material outward.

64. In a typebar-machine, the combination, with a blank-holder and dies suitable for forming a line of type, of means for producing a relative transverse feeding movement decreasing in speed during the later stages of such movement between a die and the blank-holder during a type-forming operation and means for simultaneously oscillating the one with relation to the other to induce flowage in that portion of the blank in the blank-holder concerned in forming a type and causing the gradual working of excess material outward.

65. In a typebar-machine, the combination, with a blank-holder and dies suitable for forming a line of type, of means for producing a relative transverse feeding movement between a die and the blank-holder during a type-forming operation and means for simultaneously oscillating the one with relation to the other with an amplitude of oscillation decreasing in the later stages of such oscillation to induce flowage in that portion of a blank in the blank-holder concerned in forming a type and causing the gradual working of excess material outward.

66. In a typebar-machine, the combination, with a blank-holder and dies suitable for forming a line of type, of means for producing a relative transverse feeding movement decreasing in speed during the later stages of such movement between a die and the blank-holder during a type-forming operation and means for simultaneously oscillating the one with relation to the other with an amplitude of oscillation decreasing in the later stages of such oscillation to induce flowage in that portion of a blank in the blank-holder concerned in forming a type and causing the gradual working of excess material outward.

67. The combination, with a die and means for conveying it periodically past the type-forming point, of means for producing a temporary cessation of such periodic motion when the die is at the type-forming point and means for subjecting the blank to the repeated treatment of the die, when the die is so located, applied transversely to the line joining the character-field of the forming character with the character-field of an adjacent character.

68. The combination, with a plurality of dies and means for conveying them periodically past the type-forming point, of means for producing a temporary cessation in such periodic movement when a die is at the type-forming point and means for subjecting the blank to the repeated treatment of each die in turn, when so located, applied transversely to the line joining the character-field of the forming character with the character-field of the adjacent character.

69. The combination, of a plurality of dies mounted on an orbitally and rotatably movable die-wheel; means for rotating the die-wheel to bring a die to the type-forming point; means for conveying the die-wheel periodically past the type-forming point; and mechanism for producing a temporary cessation in the periodic motion of the die-wheel when a die is at the type-forming point.

70. The combination, of a plurality of dies mounted on a plurality of orbitally and rotatably movable die wheels; means for rotating a die-wheel to bring a selected die thereon to the type-forming point; means for conveying the die-wheels periodically past the type-forming point; mechanism for producing a temporary cessation in the periodic motion of the die-wheels when the selected die is at the type-forming point; and keys for controlling the rotative movement of the die-wheels.

71. The combination, of orbitally and rotatably movable die-wheels; shafts to which the die-wheels are attached; a carrier in which the die-wheels are mounted; keys for controlling the rotative movement of the die-wheels; means for producing a temporary cessation in the periodic motion of a die-wheel when a selected die thereon is at the type-forming point; and means for automatically returning the die-wheel after the die thereon has operated to form a type, to its normal position.

72. In a typebar-machine, the combination, of a carrier; a driving-shaft; orbitally and rotatably movable die-wheels mounted in the carrier; and mechanism intermediate of the driving-shaft and the carrier for producing a temporary cessation in the movement of the carrier when a die upon a die-wheel is at the type-forming point.

73. In a typebar-machine, the combination, of a carrier; a driving-shaft; orbitally and rotatably movable die-wheels mounted in the carrier; mechanism for producing a temporary cessation in the motion of the carrier when a die on a die-wheel is at the type-forming point; and means for causing a particular die to operate.

74. In a typebar-machine, the combination, of a rotary carrier; a driving-shaft; orbitally and rotatably movable die-wheels mounted in the carrier; mechanism for producing a temporary cessation in the motion of the carrier when a die on a die-wheel is at the type-forming point; and means for causing a particular die to operate.

75. In a typebar-machine, the combination, of a rotary carrier; die-wheels mounted in the carrier; a main driving-shaft; a gear-wheel for rotating the carrier; a gear-wheel connected rigidly with the carrier; and an intermediate gear-wheel engaging with said mentioned gear-wheels and adapted to swing to-and-fro.

76. In a typebar-machine, the combination, of a rotary carrier; die-wheels mounted in the carrier; a main driving-shaft; a gear-wheel for rotating the carrier; a gear-wheel connected rigidly with the carrier; an intermediate gear-wheel engaging with said mentioned gear-wheels; a swinging arm on which said intermediate gear-wheel is mounted; and a crank for oscillating this arm.

77. The combination, with a die and means for conveying it periodically past the type-forming point, of means for producing a temporary cessation of such periodic motion when the die is at the type-forming point and causing it to operate to form a type, and an oscillatory blank-holder.

78. The combination, with a plurality of dies and means for conveying them periodically past the type-forming point, of means for producing a temporary cessation in such periodic movement when a die is at the type-forming point and causing it to operate to form a type, and an oscillatory blank-holder.

79. The combination, of a plurality of dies mounted on a die-wheel; means for rotating the die-wheel to bring a die to the type-forming point; means for conveying the die-wheel periodically past the type-forming point; mechanism for producing a temporary cessation in the periodic motion of the die-wheel when a die is at the type-forming point; and an oscillatory blank-holder.

80. The combination, of a plurality of dies mounted on a die-wheel; means for rotating the die-wheel to bring a die to the type-forming point; means for conveying the die-wheel periodically past the type-forming point; mechanism for producing a temporary cessation in the periodic motion of the die-wheel when a die is at the type-forming point; a key for controlling the rotative movement of the die-wheel; and an oscillatory blank-holder.

81. The combination, of die-wheels; shafts to which die-wheels are attached; a carrier in which the die-wheels are mounted; keys for controlling the rotative movement of the die-wheels; means for producing a temporary cessation in the periodic motion of the die-wheels when a die is at the type-forming point; means for automatically rendering the die-wheels inoperative to form types; and an oscillatory blank-holder.

82. In a typebar-machine, the combination, of a carrier; a driving-shaft; die-wheels mounted on the carrier; mechanism intermediate of the driving-shaft and the carrier for producing a temporary cessation in the movement of the carrier when a die upon a die-wheel is at a type-forming point, and an oscillatory blank-holder.

83. In a typebar-machine, the combination, of a carrier; a driving-shaft; die-wheels mounted in the carrier; mechanism for producing a temporary cessation in the motion of the carrier when a die on a die-wheel is at the type-forming point; means for causing a particular die to operate, and an oscillatory blank-holder.

84. In a typebar-machine, the combination, of a rotary carrier; a driving-shaft; die-wheels mounted in the carrier; mechanism for producing a temporary cessation in the motion of the carrier when a die on a die-wheel is at the type-forming point; means for causing a particular die to operate, and an oscillatory blank-holder.

85. In a typebar-machine, the combination, of a rotary carrier; die-wheels mounted in the carrier; a main-driving-shaft; a gear-wheel for rotating the carrier; a gear-wheel connected rigidly with the carrier; an intermediate gear-wheel engaging said mentioned gear-wheels and adapted to swing to-and-fro; and an oscillatory blank-holder.

86. In a typebar-machine, the combination, of a rotary carrier; die-wheels mounted in the carrier; a main driving-shaft; a gear-wheel for rotating the carrier; a gear-wheel connected rigidly with the carrier; an intermediate gear-wheel engaging with said mentioned gear-wheels; a swinging arm on which said intermediate gear-wheel is mounted; a crank for oscillating this arm; and an oscillatory blank-holder.

87. The combination, with a die and means for conveying it periodically past the type-forming point; of means for producing a temporary cessation of such periodic motion when the die is at the type-forming point and causing it to operate to form a type; an oscillatory blank-holder; and means for oscillating the holder and simultaneously feeding the same toward a die.

88. The combination, with a die and means for conveying it periodically past the type-forming point; of means for producing a temporary cessation of such periodic motion when the die is at the type-forming point and causing it to operate to form a type; an oscillatory blank-holder; and means for oscillating the holder with a varying oscillation and simultaneously feeding the same toward a die with a varying feed movement.

89. In a typebar-machine, the combination, with a carriage, of a blank-holder pivotally supported on the carriage; means for imparting a lengthwise movement to the carriage; and means for oscillating the holder.

90. In a typebar-machine, the combination, of a carriage provided with uprights; a blank-holder; side pieces on which the holder is pivotally supported; means for imparting a lengthwise movement to the side pieces; and means for oscillating the holder.

91. In a typebar-machine, the combination, of a carriage provided with uprights; a blank-holder; side pieces on which its holder is pivotally supported; means for imparting a lengthwise movement to the side pieces; and means for oscillating the holder and for feeding the carriage to bring successive portions of the blank to the type-forming point.

92. In a typebar-machine, the combination, of a carriage provided with uprights; a blank-holder; side-pieces on which the holder is pivotally supported; means for imparting a lengthwise movement to the side pieces; means for oscillating the holder; and means for detachably connecting the feed mechanism with the carriage.

93. The combination with a holder for a type-bar blank, of a die, and means for oscillating one of these about an axis parallel to the type line of a blank in said holder for 94. In a typebar machine the combination of a rotary carrier, a driving shaft, orbitally and rotatably movable die-wheels mounted on the carrier, mechanism for producing a temporary cessation in the motion of the carrier when a die-wheel is at the type-forming point, and means for rotating a selected one of said die-wheels for bringing a selected die thereon to the type-forming point.

95. In a typebar machine the combination of a rotary carrier, a driving shaft, orbitally and rotatably movable die-wheels mounted on the carrier, mechanism for producing a temporary cessation in the motion of the carrier when a die-wheel is at the type-forming point, and means for rotating a selected one of said die-wheels for bringing a selected die thereon to the type-forming point.

96. In a typebar machine the combination of a rotary carrier, a driving shaft, orbitally and rotatably movable die-wheels mounted on the carrier, mechanism for producing a temporary cessation in the motion of the carrier when a die-wheel is at the type-forming point, and means for rotating a selected one of said die-wheels for bringing a selected die thereon to the type-forming point at such cessation, means for holding a line of type blank, and means for oscillating said holder at the periods of cessation of motion of the carrier upon a line parallel with the contemplated line of type.

97. The combination with a rotary and revoluble die carrier, of independent means for rotating and for revolving the same, a starting arm fast with said carrier and having a re-setting heel, a plurality of detaining devices disposed about the path of movement of said arm, spring means for forcing each of said detaining devices into said path of revolution, means for maintaining said members out of said path and against the said spring action, means for releasing the same for inaugurating a rotary movement of the die carrier and embodying a rock shaft, a tripper on the rock shaft, and means for rocking the shaft.

98. The combination with a rotary die carrier, of means for revolubly shifting said die carrier, a setting arm fast with the die carrier for instituting a rotation thereof, said arm having a re-setting heel, a number of latches disposed about the circuit of movement of said arm and radially movable into the said path, detents for holding said latches out of the said path, springs for advancing said latches into the said path, said latches being arranged in the plane of the said orbit, selective mechanism embodying a lever for each latch, a rock arm disposed adjacent to each of said latches and having an actuator for releasing the same to the said spring influence, an engaging arm carried by each rock shaft, and segmental actuators connected with said levers, the actuator arm for each latch being disposed in the plane of its segmental actuator.

99. The combination with a die and means for conveying it periodically into and out of the type-forming position, of means for producing a temporary intermission of the movement of the die when it is at the type-forming position, a pivoted blank holder and means for vibrating the holder and shifting the same toward the die at such period of intermission.

100. The combination with a carrier, of a die-wheel mounted thereon, a plurality of dies upon said die carrier, means for rotating the carrier to bring the die-wheel at regularly recurring intervals past the type-forming point, means for rotating the die-wheel to bring a selected die into and out of the type-forming point, means for producing a temporary discontinuance of the rotation of said carrier and wheel when the selected die is at the type-forming point, an oscillatory blank holder and means for oscillating the holder and simultaneously feeding the same toward the die during such discontinuance of movement.

101. The combination with a die and means for conveying it at regularly recurring intervals into and out of the type-forming point, means for producing a temporary discontinuance of the movement of said die when it is at the type-forming point, a blank holder and means for oscillating the said holder with varying oscillations and simultaneously feeding the same toward the die with a varying feed movement during the said discontinuance of movement of said die.

102. In a typebar machine, the combination of a rotary carrier, a number of die-wheels mounted upon the carrier, mechanism for producing a temporary cessation of the motion of the carrier when either of said die-wheels enters the type-forming position, means for rotating a particular one of said die-wheels for bringing a particular die to the operative point at such period of cessation of motion, a blank holder, and means for presenting a blank in said holder to said die at the said period of cessation of movement.

103. The combination of a die-wheel and a plurality of dies mounted thereon, means for revolving the die-wheel periodically past the type-forming point, means for rotating the die-wheel to bring a particular die to the type-forming point, mechanism for producing a temporary cessation of said rotation and revolution when the said particular die is at the type-forming point, a blank holder, and means for bringing a blank in the holder into working engagement with said particular die at the said cessation of its movements.

104. The combination with a die-wheel, of a plurality of dies carried thereby, a blank-holder, means for conveying the die-wheel periodically past the blank holder, means for rotating the die-wheel to bring a particular die adjacent to a blank in said holder, mechanism for producing a temporary cessation of the motions of the die-wheel when said particular die is adjacent to said blank, and mechanism for actuating the blank holder for bringing the blank therein into working engagement with said die.

105. The combination with a plurality of dies, an orbitally and rotatably movable die-wheel carrying said dies, means for orbitally conveying the die-wheel periodically past the type-forming point, means for rotating the die-wheel to bring a die to the type-forming point, and mechanism for producing a temporary cessation in the motions of the die-wheel when a particular die is at the type-forming point.

106. The combination of a plurality of dies, an orbitally and rotatably movable die-wheel carrying the same, means for orbitally conveying the die-wheel periodically past the type-forming point, means for rotating the die-wheel, a series of means for inaugurating the rotation of said die-wheel, each having reference to bringing a particular die thereon to the type-forming point, and mechanism for producing a temporary cessation of the motions of the die-wheel when said particular die is at the type-forming point.

107. A typographic machine embodying a type-wheel having a plurality of dies mounted thereon and means in combination therewith for conveying the die-wheel periodically past the type-forming point; means for rotating the die-wheel, and selective means coöperative therewith for bringing a particular die into and out of the type-forming point; means for producing a temporary cessation of the said movements of the die-wheel when such particular die is at the type-forming point; and means for bringing a blank and said selected die, when at the type-forming point, into working relation.

108. The combination with a blank-holder, of a die, means for confining the action of the die to a determinate portion of the blank, means for producing a relative transverse feeding movement of the die and blank-holder one toward the other, and means for imparting a subsidiary movement to one of the members concurrently with the feeding movement for inducing a flowage in the blank in the holder and causing the gradual working of excess material outward crosswise of the blank.

109. The combination with a blank-holder, of a die, means for confining the action of the die to a determinate portion of the blank, means for producing a relative transverse feeding movement of the die and blank-holder toward each other, and means for imparting a subsidiary movement to one of the members simultaneously with this feeding movement to induce flowage in a blank in the holder and cause the gradual working of excess material outward.

110. The combination with a blank holder, of a die, means for confining the action of the die to a determinate portion of the blank, means for producing a transverse feeding movement of the die and the blank one relative to the other, and means for imparting a varying subsidiary movement to one of the members simultaneously with said feeding movement.

111. The combination with a type die, means for oscillating a typebar blank upon the axis disposed longitudinally thereof with decreasing speed during the later stages of the movement.

112. The combination with a type die of means for producing a relative feeding movement of a typebar blank toward the die decreasing in speed during the later stages of the movement, and means for imparting a subsidiary movement to one of the members during the feeding movement.

113. The combination with a type die, of means for producing a relative feeding movement of a typebar blank toward the die decreasing in speed during the later stages of the movement, and means for imparting a subsidiary movement to one of the members during the feeding movement decreasing in extent during its later stages.

114. The combination with a typebar blank holder, of a plurality of type dies, means for bringing the dies selectively to working position relative to a blank in the holder, and means for oscillating the holder about an axis disposed longitudinally of said blank.

FRANCIS H. RICHARDS.

Witnesses:
Fred. J. Dole,
C. E. Voss.